United States Patent
Barnard et al.

(10) Patent No.: US 7,454,482 B2
(45) Date of Patent: Nov. 18, 2008

(54) PRINT QUEUE MANAGER

(75) Inventors: John D. Barnard, Orange, CA (US); Don Hideyasu Matsubayashi, Monterey, CA (US); Don Francis Purpura, Yorba Linda, CA (US); Steve Yasuhiro Muto, Irvine, CA (US); Allison Bajo, Carson, CA (US); Ravichandran Ragunathan, Ladera Ranch, CA (US); Hye-Sook Kim Lee, Cypress, CA (US)

(73) Assignee: Canon Information Systems, Inc., Irvine, CA (US)

( * ) Notice: Subject to any disclaimer, the term of this patent is extended or adjusted under 35 U.S.C. 154(b) by 630 days.

(21) Appl. No.: 09/892,525

(22) Filed: Jun. 28, 2001

(65) Prior Publication Data

US 2003/0005097 A1 Jan. 2, 2003

(51) Int. Cl.
G06F 15/16 (2006.01)
G06F 15/173 (2006.01)
G06F 15/00 (2006.01)
G06F 3/12 (2006.01)
H04L 12/413 (2006.01)

(52) U.S. Cl. .................. 709/220; 709/223; 709/224; 358/1.15; 358/1.13; 370/445

(58) Field of Classification Search ............. 709/220, 709/223, 226, 245; 358/1.15, 1.13; 707/201
See application file for complete search history.

(56) References Cited

U.S. PATENT DOCUMENTS

| | | | |
|---|---|---|---|
| 5,564,109 A | 10/1996 | Snyder et al. ............... 395/828 |
| 5,655,148 A | 8/1997 | Richman et al. ............ 395/828 |
| 5,680,323 A * | 10/1997 | Barnard ..................... 715/720 |
| 5,764,911 A | 6/1998 | Tezuka et al. ............... 395/200 |
| 5,907,696 A * | 5/1999 | Stilwell et al. ............... 703/13 |
| 5,918,016 A * | 6/1999 | Brewer et al. ............... 709/220 |
| 5,922,049 A | 7/1999 | Radia et al. ................. 709/220 |
| 5,930,465 A * | 7/1999 | Bellucco et al. ........... 358/1.15 |
| 6,029,155 A | 2/2000 | Bass et al. .................. 705/401 |
| 6,073,178 A | 6/2000 | Wong et al. ................. 709/229 |
| 6,101,499 A | 8/2000 | Ford et al. ................... 707/10 |
| 6,112,256 A | 8/2000 | Goffinet et al. .............. 710/8 |
| 6,145,031 A | 11/2000 | Mastie et al. ................ 710/52 |
| 6,184,996 B1 | 2/2001 | Gase ........................ 358/1.15 |
| 6,195,709 B1 | 2/2001 | Güpner et al. .............. 709/316 |

(Continued)

FOREIGN PATENT DOCUMENTS

EP 0 824 235 2/1998

(Continued)

OTHER PUBLICATIONS

Print Queue Manager Home Page (visited Mar. 27, 2001) <http://www.printqueuemanager.com/products/>.

*Primary Examiner*—John Follansbee
*Assistant Examiner*—Karen C Tang
(74) *Attorney, Agent, or Firm*—Fitzpatrick, Cella, Harper & Scinto

(57) ABSTRACT

Managing a plurality of printing devices on a network, including detecting a printing device connected on the network, requesting information from the detected printing device, receiving the requested information from the printing device, and creating a print queue for the printing device based on the received information.

104 Claims, 14 Drawing Sheets

U.S. PATENT DOCUMENTS

| | | | |
|---|---|---|---|
| 6,301,012 B1 | 10/2001 | White et al. | 358/1.15 |
| 6,628,413 B1 * | 9/2003 | Lee | 358/1.15 |
| 6,678,068 B1 * | 1/2004 | Richter et al. | 358/1.15 |
| 6,757,741 B1 * | 6/2004 | Hertling | 709/245 |
| 6,778,292 B1 * | 8/2004 | Someno | 358/1.16 |
| 6,820,124 B1 * | 11/2004 | Clough | 709/229 |
| 6,920,506 B2 | 7/2005 | Barnard et al. | 709/245 |
| 6,989,910 B2 * | 1/2006 | Lomas et al. | 358/1.15 |
| 2002/0116544 A1 * | 8/2002 | Barnard et al. | 709/324 |
| 2002/0120659 A1 * | 8/2002 | Parry | 709/100 |
| 2002/0138558 A1 * | 9/2002 | Ferlitsch | 709/203 |
| 2002/0138564 A1 * | 9/2002 | Treptow et al. | 709/203 |
| 2002/0196460 A1 * | 12/2002 | Parry | 358/1.15 |
| 2003/0005097 A1 * | 1/2003 | Barnard et al. | 709/223 |
| 2003/0005100 A1 * | 1/2003 | Barnard et al. | 709/223 |
| 2003/0043395 A1 * | 3/2003 | Takahashi | 358/1.13 |
| 2004/0210897 A1 * | 10/2004 | Brockway et al. | 717/174 |

FOREIGN PATENT DOCUMENTS

| | | |
|---|---|---|
| EP | 0 952 513 | 10/1999 |
| JP | 11-102270 | 9/1997 |
| JP | 11-191047 | 12/1997 |
| JP | 2000-33755 | 2/2000 |
| WO | WO 00/26807 | 5/2000 |
| WO | WO 0026807 * | 5/2000 |

* cited by examiner

DEVICE MANAGEMENT DIRECTORY 70

| ENTRY 90 | MAC ADDRESS 91 | PRINT DEVICE TYPE 92 | IP ADDRESS 93 | NETWORK CONFIGURATION INFORMATION 94 |
|---|---|---|---|---|
| Entry 1 | 00:00:85:69:0A:B3 | Canon Laser | 129.65.220.8 | Domain Name, etc. |
| --- | --- | --- | --- | --- |
| --- | --- | --- | --- | --- |
| --- | --- | --- | --- | --- |
| --- | --- | --- | --- | --- |
| --- | --- | --- | --- | --- |
| Entry N | --- | --- | --- | --- |

FIG. 7

PRINT QUEUE CONFIGURATION DIRECTORY 71

| | IP ADDRESS 100 | MAC ADDRESS 101 | PRINT QUEUE NAME 102 | PRINTING CAPABILITIES 103 | SERVER 105 |
|---|---|---|---|---|---|
| Entry 1 | 129.65.220.8 | 00:00:85:69:0A:B3 | Canon Laser | Color, Letter, A4 | Main A |
| --- | --- | --- | --- | --- | --- |
| --- | --- | --- | --- | --- | --- |
| --- | --- | --- | --- | --- | --- |
| --- | --- | --- | --- | --- | --- |
| --- | --- | --- | --- | --- | --- |
| ENTRY N | --- | --- | --- | --- | --- |

FIG. 8

PRINT QUEUE MANAGER

BACKGROUND OF THE INVENTION

1. Field of the Invention

The invention concerns the administration of printing devices in a network environment. In particular, the invention concerns the creation and management of print queues corresponding to printing devices connected on a network.

2. Incorporation by Reference

U.S. patent application Ser. No. 09/664,531, entitled "Object-Based Architecture For Supporting Network Devices," filed Sep. 18, 2000, is incorporated by reference as if fully set forth in full herein.

3. Description of the Related Art

The administration of printing devices in a network environment is typically a tedious and time consuming task for network administrators. In particular, for large and complex network environments having several local servers, there may be a large number of printers distributed throughout the network. Network administrators must not only install new printing devices on the network, they must also create and manage the print queues associated with the printing devices and facilitate network users connecting to and utilizing the printing devices.

In large computer networking environments, the administrative tasks required to create and configure print queues associated with printing devices connected to the network can be demanding. For example, when creating a print queue for a printing device, a network administrator generally must manually enter information such as the address assigned to the printing device, the particular type of printing device, and the configuration or capabilities of the printing device. As the number of printing devices increases, the time and effort required to obtain the needed information and create and configure the necessary print queues can become excessively burdensome.

Once a print queue has been created and configured for a particular printing device, network users may begin utilizing the printing device by locating and connecting to the desired print queue, and installing any necessary print drivers. However, searching for the desired print queue often requires the network user to search lists of print queues on multiple network servers. In networking environments employing a large number of servers, finding a desired print queue can be confusing and very time consuming.

As printing devices within an existing computer network are relocated or reassigned addresses, typically a network administrator must update the configuration stored for the respective print queues to reflect any change of address on the network. Additionally, if the name of a print queue is changed, all user workstations using that particular print queue must be updated with the new name or the user workstations will lose their connection to the printing device. As the size of the computer network increases, updating print queue configuration information and ensuring all workstations have updated print queue names becomes very time consuming.

SUMMARY OF THE INVENTION

The present invention addresses the foregoing problems by providing for the automatic creation and configuration of print queues upon detecting printing devices on a network. Specifically, the invention detects new printing devices connected on a network. Upon detection of a printing device, information is obtained from the detected printing device and a print queue is created. Accordingly, the present invention helps reduce the burden of manually creating and configuring print queues for connected printing devices.

One aspect of the invention concerns detecting a printing device connected on a network and requesting information from the detected printing device. The requested information is received from the printing device and a print queue is created for the printing device based on the received information.

The invention preferably includes detecting a printing device by detecting an address assignment message sent between an address server and the printing device over the network. The invention also includes detecting the printing device by sending a request message to a plurality of network addresses and receiving a response message from the printing device located at one of the network addresses. Additionally, the invention includes detecting a printing device by broadcasting a request message over a network and receiving a response message from the printing device connected on the network.

The invention also preferably includes publishing the newly created print queue to the network. Additionally, it is preferable to create a print queue entry in a print queue configuration database that includes configuration data related to the print queue. Preferably a web page is created containing links representing each of the print queues with entries in the print queue configuration database. By selecting a link on the web page, a user can preferably configure a workstation to print to the print queue represented by the link. It is also preferable to detect a new IP address of one of the printing devices and update both the configuration of the print queue corresponding to the printing device and the configuration data in the print queue entry of the configuration database corresponding to the printing device. Finally, it is preferable to detect new identification information of a print queue and update a connection between a network workstation and the print queue to reflect the new identification information.

By virtue of the foregoing, print queues are created and configured upon detection of a printing device. In addition, changes in printing device addresses or print queue identification information are updated in the corresponding print queue configurations, and network workstations are notified of the changes. Accordingly, tedious and time consuming tasks involved in the management of network printing devices are reduced.

This brief summary has been provided so that the nature of the invention may be understood quickly. A more complete understanding of the invention can be obtained by reference to the following detailed description of the preferred embodiment in connection with the attached drawings.

BRIEF DESCRIPTION OF THE DRAWINGS

FIG. 7 is a block diagram depicting a device management directory for use in one embodiment of the present invention.

FIG. 8 is a block diagram depicting a print queue configuration directory for use in one embodiment of the present invention.

DETAILED DESCRIPTION OF THE PREFERRED EMBODIMENTS

Figure 1:
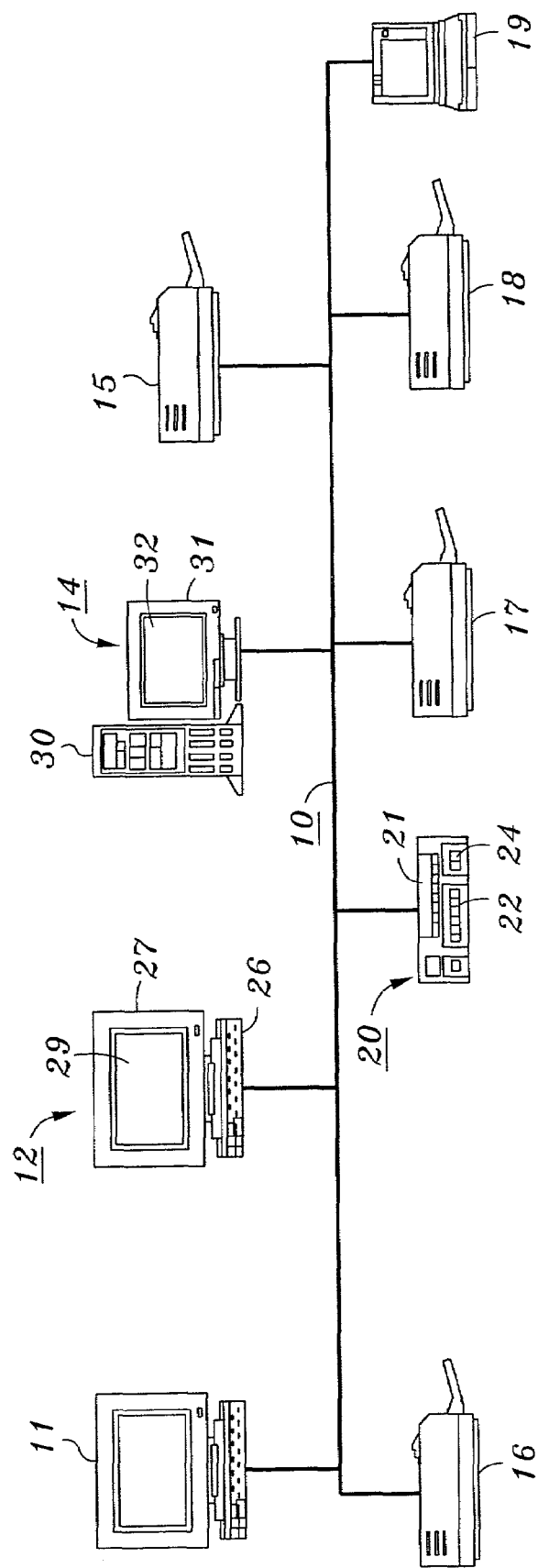
FIG. 1 is a depiction of a network environment in which the present invention may be practiced.

FIG. 1 depicts a network environment in which the present invention may be practiced. As seen in FIG. 1, network 10 is provided which is a typical network that is supported by TCP/IP and other protocols as discussed further herein. Connected to network 10 are workstations 11 and 12, server 14, printers 15, 16, 17 and 18, laptop 19 and network management device 20. Network management device 20 is used to implement the present invention for managing a plurality of network devices, such as network printers 15, 16, 17 and 18. The configuration and functionality of network management device 20 is discussed in more detail below. In this regard, the invention is described below with respect to management of network printers; however, it should be appreciated that the present invention of network management device 20 can be used to manage any type of network device.

Workstations 11 and 12 are typical computing workstations having host processor 26 for supporting user interface 29, thereby allowing a user of either one of workstations 11 or 12 to work with typical applications, such as word processing, and to access functional services provided by other devices on network 10, such as printing services.

Server 14 is a typical server having host processor 30 which includes a large fixed disk for containing files and/or applications which can be accessed and shared by other users on network 10. Server 14 also has display 31 for supporting user interface 32. Laptop 19 is a conventional laptop computer having a host processor and display, thereby allowing it to operate in a manner similar to workstations 11 and 12.

Figure 2:
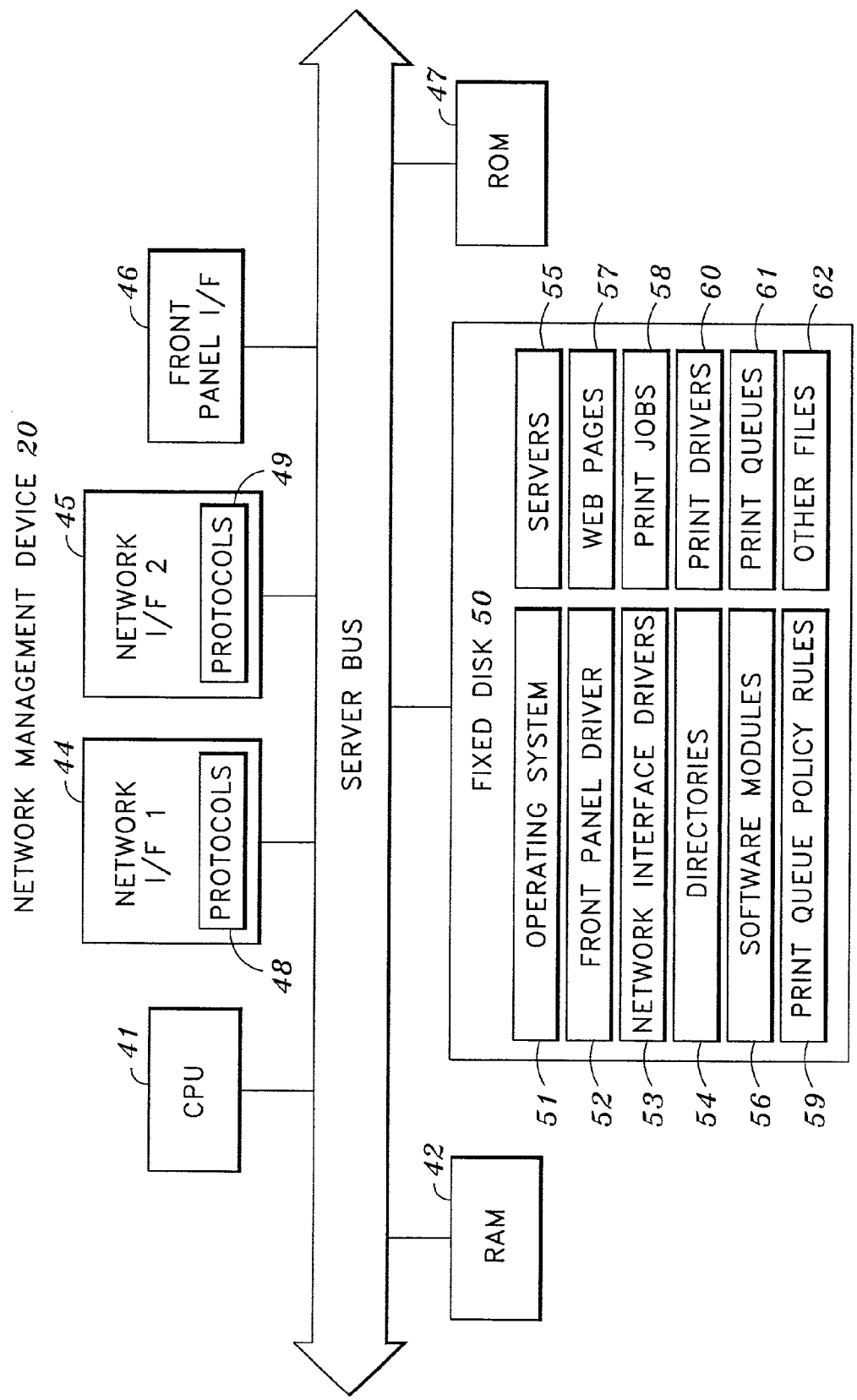
FIG. 2 is a block diagram illustrating an internal architecture a network management device according to one embodiment of the present invention.

FIG. 2 is a block diagram for explaining the internal architecture of network management device 20. As seen in FIG. 2, network management device 20 has a configuration similar to that of a server and includes server bus 40, CPU 41, RAM 42, ROM 47, network interfaces 44 and 45, front panel interface 46 and fixed disk 50. CPU 41 is a programmable microprocessor which is interfaced to server bus 40. RAM 42 interfaces to server bus 40 to provide CPU 41 with access to memory storage, thereby acting as the main run time memory for CPU 41. In particular, when executing stored program instruction sequences, CPU 41 loads the instruction sequences from fixed disk 50 (or other memory media) into RAM 42 and executes those stored program instruction sequences out of RAM 42. It should also be recognized that standard disk-swapping techniques allow segments of memory to be swapped to and from RAM 42 and fixed disk 50.

ROM 47 stores invariant instruction sequences, such as startup instruction sequences for CPU 41 or basic input/output operating system ("BIOS") sequences for the operation of any peripheral devices which may be attached to server 11 (not shown). Network interfaces 44 and 45 provide two separate and distinct network interfaces, thereby allowing network management device 20 to connect to two separate networks as discussed further below. As seen in FIG. 2, network interfaces 44 and 45 each have respective protocols 48 and 49 for supporting communication of network management device 20 over network 10 with other devices on network 10. For example, protocols 48 and 49 can include, but are not limited to, TCP/IP, HTTP, SNMP, DHCP, and other known network protocols, including a variety of known printing protocols.

Front panel interface 46 provides the interface to front panel 21 provided on network management device 20, thereby allowing a user such as a system administrator to monitor and input configuration information and other commands and instructions to network management device 20.

Fixed disk 50 is one example of a computer-readable medium that stores program instruction sequences which are executable by CPU 41 so as to constitute operating system 51, front panel interface driver 52, network interface drivers 53, directories 54, servers 55, software modules 56, web pages 57, print jobs 58, print queue policy rules 59, print drivers 60, print queues 61, and other files 62. Operating system 51 can be an operating system such as DOS, or a windowing operating system for networks such as Windows NT, or can be another operating system such as Unix. Front panel interface driver 52 is provided for supporting front panel interface 46 to communicate with front panel 21. Network interface drivers 53 support network interfaces 44 and 45 for allowing network management device 20 to communicate with two separate networks, as discussed above. Directories 54 contain directories for use to implement the present invention for managing a plurality of print devices on the network and are discussed further below. Servers 55 contain necessary protocol servers and other servers for implementing the present invention and are discussed further below. Software modules 56 are utilized to implement the present invention as discussed further below. Web pages 57 comprise web pages which are accessible by users on network 10 or by a system administrator on network 10 to access functional services of printing devices on network 10 and to manage the configuration of network management device 20 and of a plurality of printing devices which are managed by network management device 20 as described further below. Print jobs 58 consist of print jobs received by network management device 20 from users on network 10, such as workstations 11 and 12, for sending to printing devices managed by network management device 20. Print queue policy rules 59 comprise a predetermined set of rules and/or rules entered by a system administrator for governing how print queues are created and published for each of the printing devices which is managed by network management device 20 as discussed further below. Print drivers 60 are print drivers for supporting the various printing devices managed by network management device 20 and print queues 61 are print queues created for the printing devices management by network management device 20. Lastly, other files 62 comprise other files and applications necessary to implement the present invention and to provide additional functionality to network management device 20.

Figure 3:
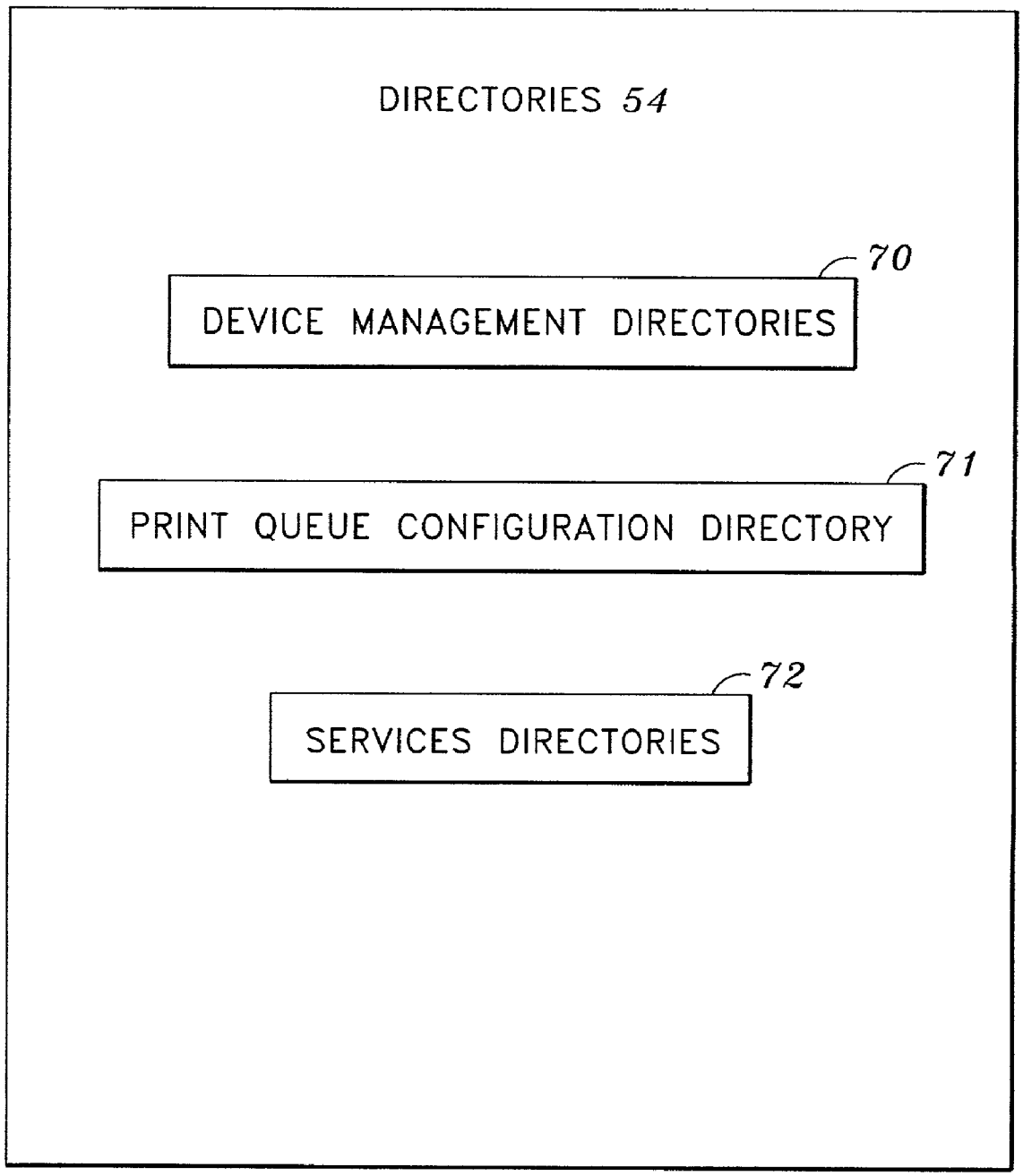
FIG. 3 is a block diagram depicting directories for use in one embodiment of the present invention.

FIG. 3 is a block diagram for showing the contents of directories 54. Specifically, directories 54 includes device management directory 70, print queue configuration directory 71 and services directories 72. Device management directories 70 include one or more device management directory which is used to store network identification and configuration information for each printing device managed by network management device 20 and is explained in further detail below. Print queue configuration directory 71 is a directory which contains printer identification information and printer capability information along with other information for each print queue which is created corresponding to a printing device managed by network management device 20. Services directories 72 include a variety of services directories for tracking and managing the functional services supported by one or more network management devices for the plurality of printing devices supported by the network management devices. Services directories 72 is discussed in more detail below.

Figure 4:
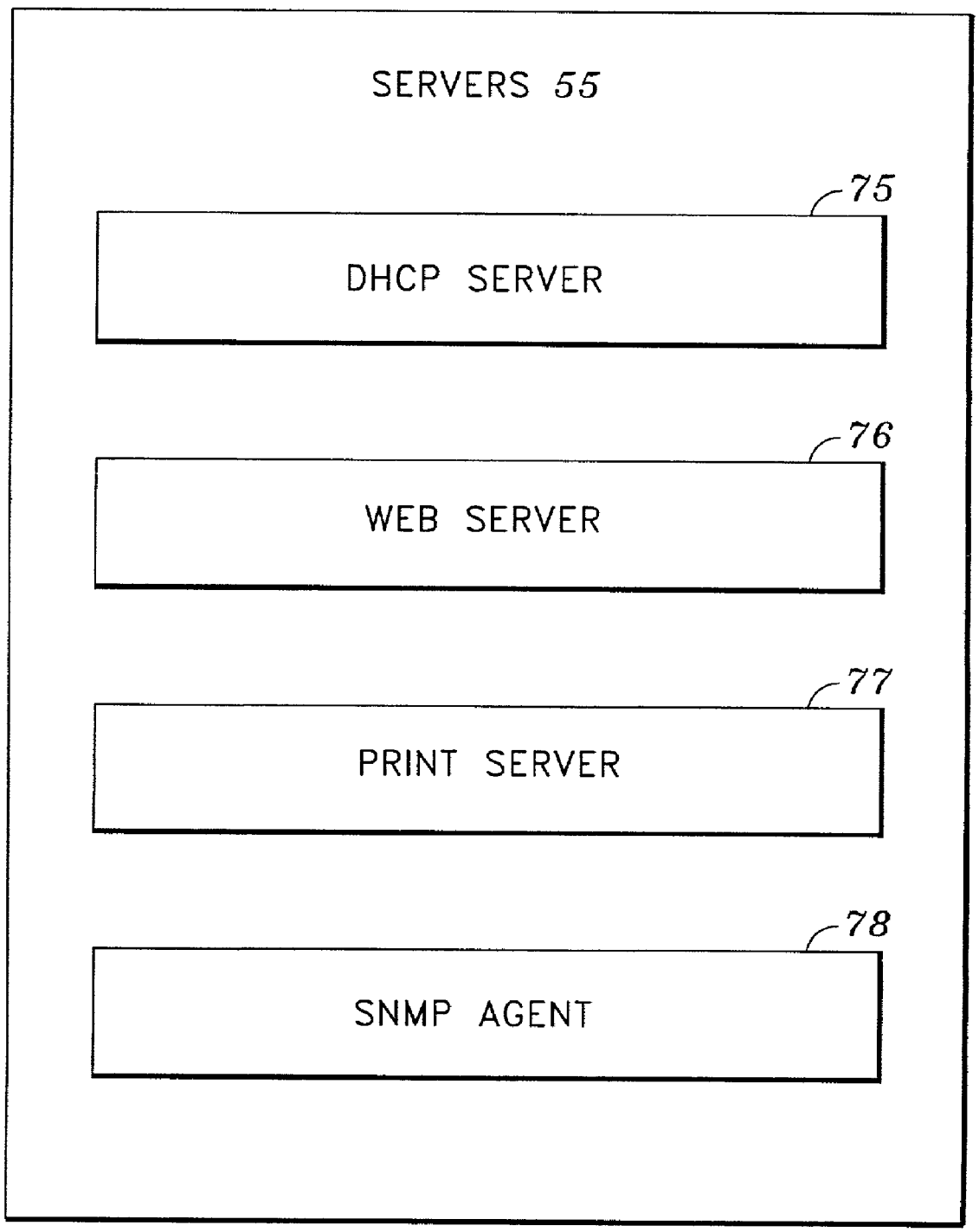
FIG. 4 is a block diagram depicting servers for use in one embodiment of the present invention.

FIG. 4 is a block diagram for explaining the contents of servers 55. As seen in FIG. 4, servers 55 includes DHCP server 75, web server 76, print server 77 and SNMP agent 78. DHCP server 75 allows network management device 20 to assign IP addresses to the plurality of printing devices which it manages, as well as to other devices on network 10. DHCP server 75 also has the capability to provide a software hook to which other modules can register. In this manner, when DHCP server 75 assigns an IP address to a printing device on network 10 and then receives an address acknowledgment message from the printing device, DHCP server 75 notifies, through the software hook, the registered software module of the IP address of printing device. This is used to trigger a discovery module to then perform targeted discovery of the printing device, as discussed more fully herein. In the alternative, network management device 20 can be configured to disable DHCP server 75 when an external DHCP server is utilized on network 10. This functionality is discussed in further detail below. Web server 76 is a typical web server and is used to publish web pages maintained by network management device 20 to other entities on network 10, such as workstations 11 and 12, or server 14. Print server 77 is a print server for managing print queues for one or more printing devices managed by network management device 20. Lastly, SNMP agent 78 allows network management device 20 to communicate with other network devices such as printing devices, over network 10 in order to send and receive network configuration information and other information related to the printing device. Preferably, SNMP agent 78 initiates SNMP communication between network management device 20 and other network devices which contain an SNMP agent for responding to the SNMP communications.

Figure 5:
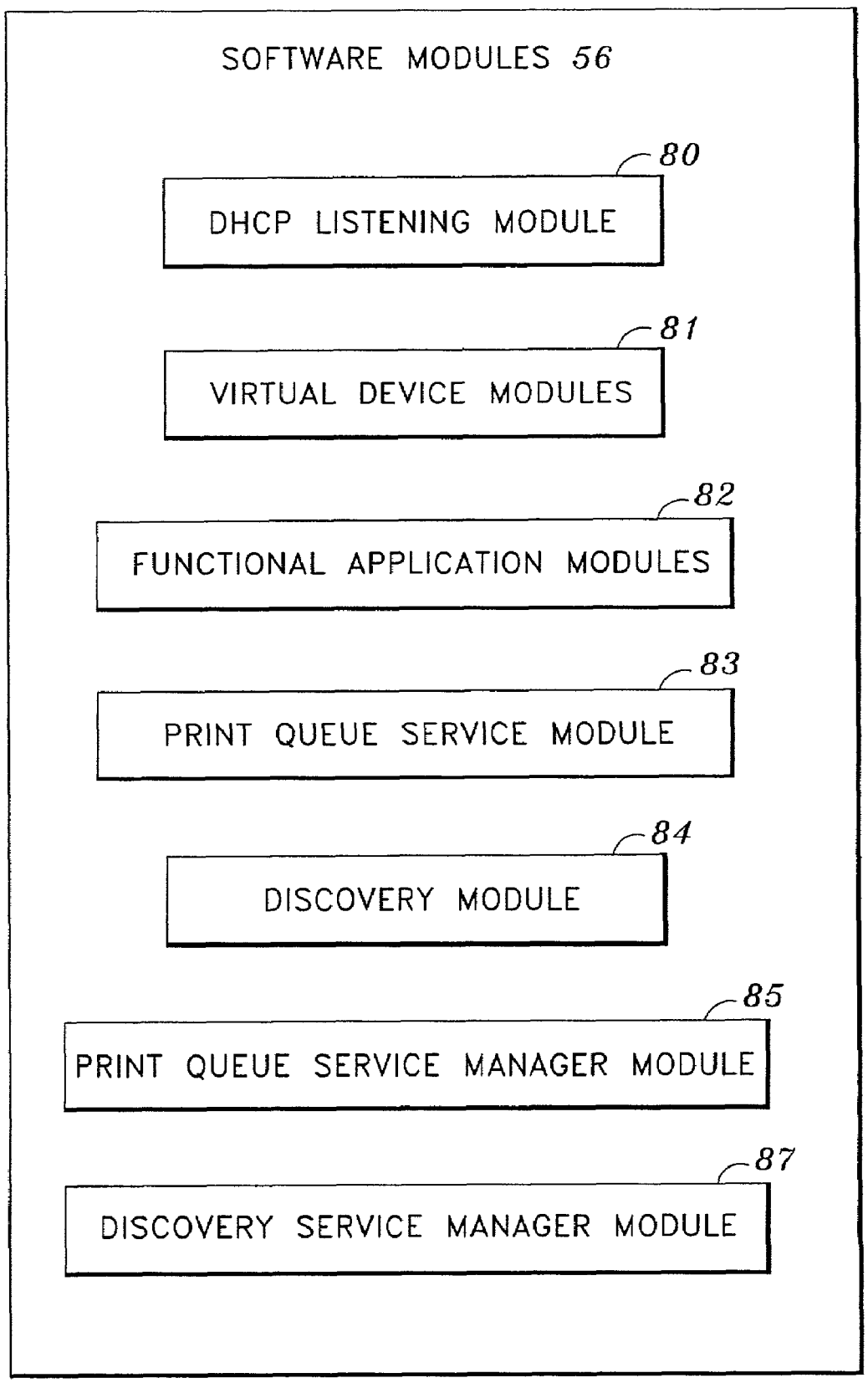
FIG. 5 is a block diagram depicting software modules for use in one embodiment of the present invention.

FIG. 5 is a block diagram for explaining the contents of software modules 56 which includes DHCP listening module 80, virtual device modules 81, functional application modules 82, print queue service module 83, discovery module 84, and print queue service manager module 85, and discovery service manager module 87. DHCP listening module 80 is a module which can be used when an external DHCP server is utilized outside of network management device 20, instead of DHCP server 75. In such a configuration, DHCP listening module 80 can be used to detect printing devices on network 10 based on the assignment of an IP address to a printing device by the external DHCP server. This functionality of DHCP listening module 80 is discussed more fully below.

Virtual device modules 81 comprise one or more virtual device module which can be initiated in correspondence to one or more printing devices supported by network management device 20 so as to extend functional capability of the printing devices. For example, a virtual device module may be executed to provide secure printing functionality on behalf of printing devices which are managed by network management device 20 and which do not have secure printing functionality embedded therein. It should be appreciated that such additional functionality can also be implemented in software without the use of a virtual device module.

Functional application modules 82 comprise modules for performing various applications such as network secure printing, and which interface with virtual device modules 81 to implement the functional services, such as secure printing, which are not directly supported by one or more printing devices managed by network management device 20. Functional application modules are discussed in more detail below. Print queue service module 83 interfaces with discovery module 84 to create a new print queue when a new printing device is discovered.

Discovery module 84 is a module which is used to perform discovery on detected printing devices on network 10 so as to obtain information regarding a printing device's network settings, and functional capabilities. Depending on the mode of operation of network management device 20, discovery module 84 can receive notification of a detected printing device through a software hook from DHCP server 75, from classic discovery methods and/or from DHCP listening module 80. The functionality of discovery module 84 and print queue service module 83 is discussed in more detail below.

Print queue service manager module 85 is a management application which allows multiple network management devices on a same network to avoid confusion regarding the detection and discovery of printing devices across the network and to distribute and share the processing load of supporting the various printing devices across the network between the multiple network management devices based on available resources of each network management device and based on the location of each network management device within the network. Print queue service manager module 85 is discussed in more detail below. In a similar fashion, discovery service manager module 87 manages the discovery modules among multiple network management devices to prevent confusion in the detection, discovery and management of printing devices. Discovery service manager module 87 also has the capability to distribute the load for performing discovery of printing devices on a given network between multiple network management devices. This functionality is discussed in more detail below.

Figure 6:
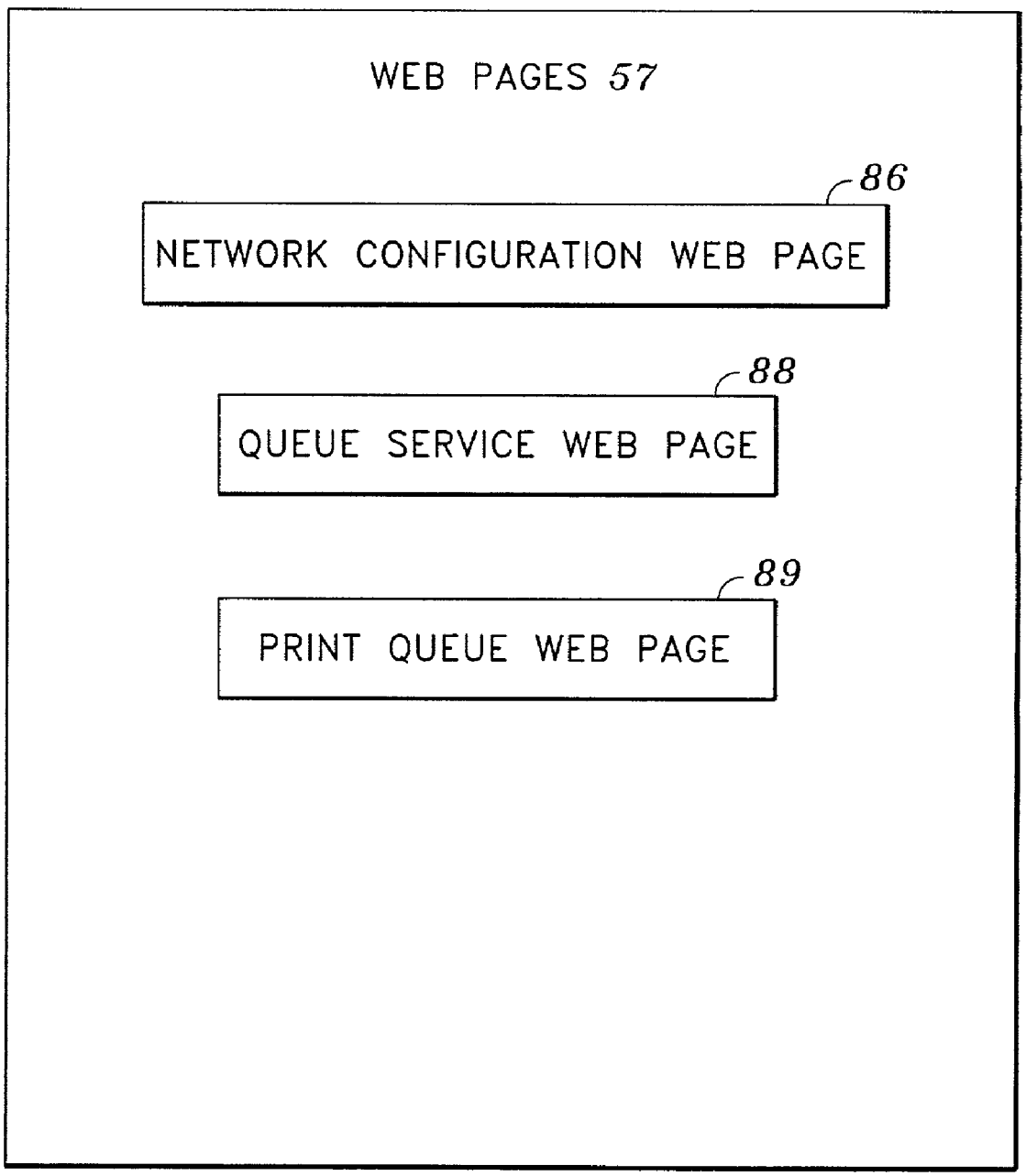
FIG. 6 is a block diagram depicting the web pages for use in one embodiment of the present invention.

Turning to FIG. 6, web pages 57 is depicted which contains network configuration web page 86, queue service web page 88, and print queue web page 89. Network configuration web page 86 allows a user, preferably a system administrator, to have a web-based interface for managing the configuration and operational parameters of network management device 20, or of multiple network management devices, at a single location. In addition, network configuration web page 86 allows a user, such as a system administrator, to configure and manage the printing devices which are managed by network management device 20. Queue service web page 88 allows a user, such as a system administrator, to access and manage the print queues for all printing devices managed by network management device 20 and by any other network management devices residing on network 10. Queue service web page 88 therefore allows a system administrator to view and manage all print queues supported by network management device 20 and other network management devices, and to view and manage print jobs within each respective print queue. Print queue web page 89 is a web page that is accessible to users of network 10, such as workstations 11 and 12, in order to publish in one location all available print queues managed by network management device 20 and any other network management devices on network 10 so that a user can quickly and efficiently find a needed print queue and can also download print driver corresponding to the printing device associated with a designated print queue.

FIG. 7 is a block diagram for explaining one of device management directories 70. As seen in FIG. 7, the device management directory is utilized for containing identification and network configuration information with respect to each printing device detected and discovered by the present invention. In particular, device management directory 70 contains a plurality of entries 90, each entry corresponding to a particular printing device which has been detected and discovered by network management device 20. Based on information discovered by network management device 20 from the respective device, a separate entry is created for the printing device and identification information related to the printing device, along with network configuration information of the printing device, is stored in the entry. For example, each of entries 90 has a field for entering the MAC address 91 of the corresponding printing device. In addition, each entry has a corresponding print device type 92 and IP address 93 for the printing device associated with the entry. Lastly, network configuration information 94 contains network-related information associated with the printing device for the respective entry, such as domain name and other network setting information. In this manner, a directory is provided for maintaining identification information and network configuration information of each printing device managed by network management device 20 for efficient access and management by a network user, such as a system administrator. When more than one network management device is present across network 10, other device management directories are created to provide a common location for maintaining identity and network configuration information for all printing devices managed by all network management devices on the network. This functionality is discussed in more detail below.

FIG. 8 is a block diagram for explaining print queue configuration directory 71. In particular, print queue configuration directory 71 contains a plurality of entries corresponding to each print queue which is created by the present invention for each printing device which is detected and discovered. When a print queue is created for a printing device, the configuration information related to the print queue is stored in an entry in print queue configuration directory 71 to maintain all print queue configuration information in a common location. As seen in FIG. 8, each entry in print queue configuration directory 71 corresponds to a separate print queue and contains information fields for IP address 100, MAC address 101, print queue name 102, printing capabilities 103 and server 105. IP address 100 contains the IP address of the printing device corresponding to the print queue entry and MAC address 101 also corresponds to the MAC address for the printing device. Print queue name 102 is a name which is detected by discovery from the corresponding printing device or, if it is not detected, a name is generated when the print queue is created. For example, print queue name 102 may comprise a name which is simply the make and model of the printing device which is discovered by network management device 20 from the printing device. In a similar fashion, printing capabilities 103 contains printing capabilities of the printing device associated with the print queue entry. For example, printing capabilities 103 can include, but is not limited to, color printing capabilities, recording sheet-size capability such as letter and/or A4, and resolution capabilities. Server 105 is the identity of the network management device which is maintaining the print queue for a given printing device. For example, in a network environment having multiple network management devices, different print queues may be distributed among the multiple network management devices in order to balance the processing throughput and memory load required to maintain the print queues.

Figure 9:
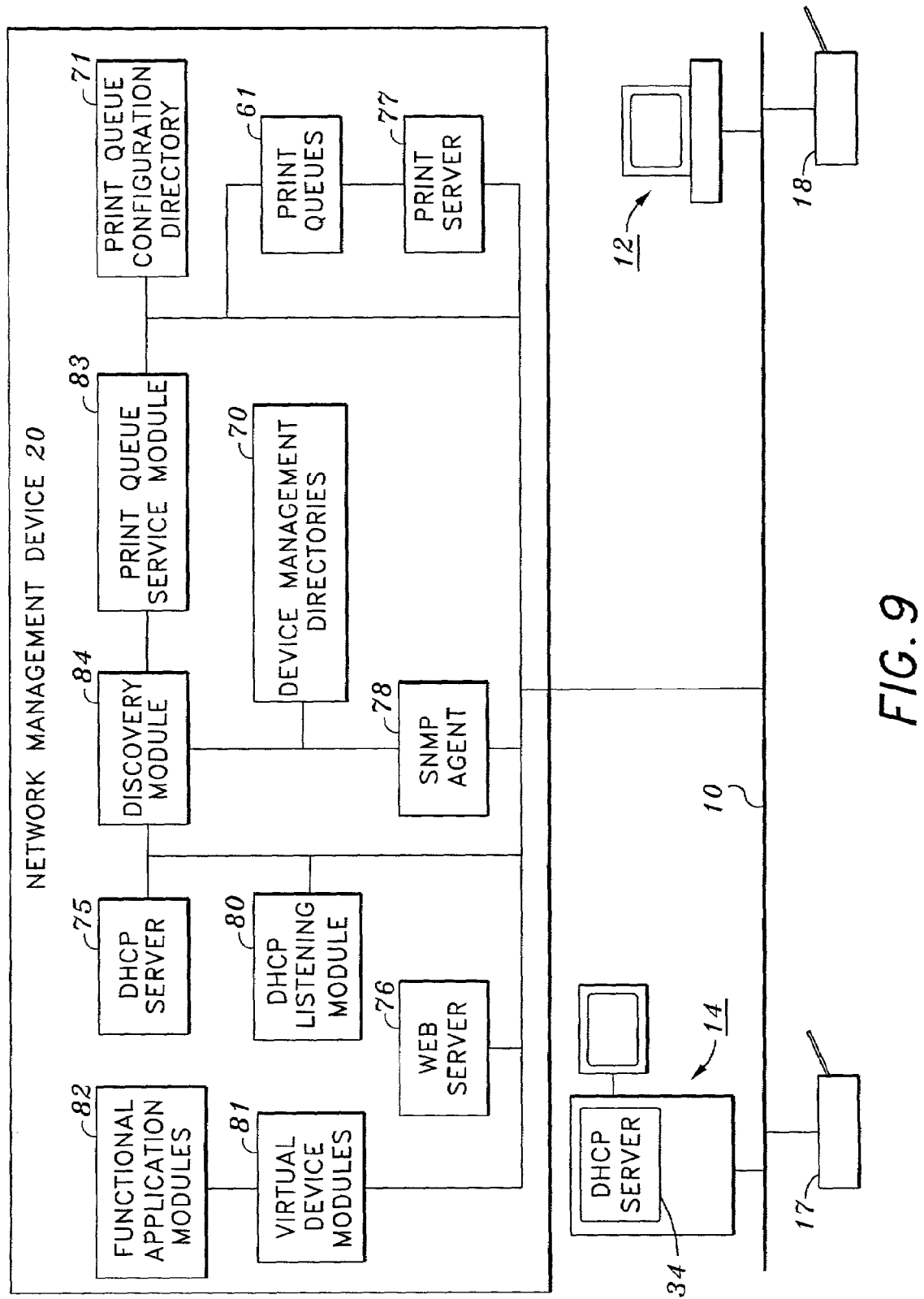
FIG. 9 is a block diagram illustrating the functionality of one embodiment of the present invention in a network environment.

FIG. 9 is a block diagram for explaining the functionality of network management device 20 in the network environment of network 10. As seen in FIG. 9, DHCP server 75 is provided in network management device 20 for supporting DHCP communications over network 10 using the DHCP protocol. In particular, DHCP server 75 can be enabled, such as by a system administrator through front panel 21, to respond to all DHCP address requests on network 10 for an IP address. In this configuration, DHCP server 75 supports a software hook to which discovery module 84 has preregistered. When DHCP server 75 receives a DHCP address request from a device on network 10, DHCP server 75 responds to the requesting device with an assigned IP address. When DHCP server 75 receives an address acknowledgment message from the requesting device, DHCP server 75 uses the software hook to notify discovery module 84 of the assignment of an IP address to the requesting device. Discovery module 84 can then determine if the requesting device is the type of network device that discovery module 84 should perform discovery on, and if so, discovery module 84 sends a discovery request message to the device to obtain information regarding the device's network settings, as well as device capabilities and configuration. A predetermined range of MAC addresses can be used by discovery module 84 to determine whether a device detected by DHCP server 75 is one for which discovery module 84 should perform discovery. In addition, a predetermined MAC address range may also be used by DHCP server 75 so that DHCP server 75 will only provide assigned IP addresses to a preferred set of network devices, such as network printers. Preferably, discovery module 84 compares the MAC address of the address acknowledgment message to the predetermined MAC address range to determine if the device is a network printer that should be discovered and managed by network management device 20.

In the alternative, network management device 20 can also be configured to disable DHCP server 75, such as by a system administrator either through front panel 21 or through network configuration web page 86. For example, when an external DHCP module is used DHCP server 75 is disabled to prevent addressing conflicts and discovery module 84 conducts classic discovery to discover all printing devices on network 10. Such classic discovery of the printing devices can include, but is not limited to, known techniques such as using broadcast discovery messages, pinging through a list of IP addresses, router table walking, and DNS lookup. For example, an SNMP broadcast discovery message can be sent and then discovery module 84 can send a targeted SNMP discovery request to each responding printing device. In the alternative, discovery module can ping through a list of IP addresses and then send a targeted SNMP discovery request to each responding printing device. As another alternative, discovery module 84 can obtain router tables from the routers on the network and then send an SNMP discovery request to each printing device having an IP address in the routing tables. Lastly, discovery module 84 can obtain a list of assigned IP addresses from a DNS server on the network and then send an SNMP discovery request to each printing device having an IP address in the list. It can be appreciated that other known methods of discovery can be used by discovery module 84 to discover printing devices on network 10 when an external DHCP server is used instead of DHCP server 75 in network management device 20.

In addition to classic discovery methods, DHCP listening module 80 can be used to detect an IP address acknowledgment message for a new requesting printing device on network 10. In particular, DHCP listening module 80 detects DHCP address acknowledgment messages which contain an IP address for a new printing device on network 10. For example, after boot-up of network management device 20 in the configuration where an external DHCP server is utilized, discovery module 84 uses classic discovery methods as discussed above to discover the printing devices existing on network 10.

After using such classic discovery, DHCP listening module 80 can then be used to detect printing devices which subsequently become operational on network 10 by detecting the IP address acknowledgment message sent from the DHCP server to the newly incorporated printing device to the external DHCP server. In this manner, DHCP listening module 80 can be used to augment classic discovery in order to supplement the list of discovered printing devices after initial boot-up of network management device 20. DHCP listening module 80 also uses a software hook, to which discovery module 84 has preregistered, to notify discovery module 84 when a newly incorporated printing device has been detected. Discovery module 84 then initiates a discovery process for obtaining information from the newly incorporated printing device, as discussed in more detail below. DHCP listening module 80 can also use a MAC address range in order to listen only for IP address acknowledgment messages corresponding to a particular class of network devices, such as network printers.

As discussed above, when an external DHCP server is used, discovery module 84 uses classic discovery methods to discover printing devices on network 10, after which DHCP listening module 80 can be used to discover subsequently incorporated printing devices. On the other hand, when DHCP server 75 is utilized, discovery module 84 is notified through the software hook from DHCP server 75 of a detected printing device. Regardless of the manner in which discovery module 84 becomes aware of a detected printing device, discovery module 84 initiates discovery of information from the printing device. Preferably, discovery module 84 sends an SNMP information request to the detected printing device by using the IP address of the detected printing device. The detected printing device then responds with an SNMP information message to provide the requested information to discovery module 84. Discovery module 84 creates an entry for each discovered printing device in device management directory 70. As discussed above, the entry corresponding to each discovered device in device management directory 70 includes the IP address, MAC address, printing device type and network configuration information corresponding to printer 18. Discovery module 84 also notifies print queue service module 83 of each discovered printing device so that print queue service module 83 can create a new print queue for the printing device and place the new print queue in print queues 61. Print queue service module 83 also creates an entry in print queue configuration directory 71 which contains identification information for the printer, such as IP address, MAC address and printing device type, as well as a print queue name and printing device capabilities. In this manner, the network configuration of printing devices is easily managed and print queues are efficiently created and maintained for the detected printing devices.

Although the block diagram of FIG. 9 shows that network management device 20 is only using one of network interfaces 44 and 45 for connecting to network 10, another configuration is supported by network management device 20 in which one of the network interfaces is used to connect to another network, such as a local network on which only printing devices reside. In such an environment, DHCP server 75 can be configured to respond only to IP address requests from printing devices on the second local network, thereby leaving DHCP server 34 of server 14 to respond to all other IP address requests on network 10. In this manner, printing devices can be physically isolated from all other network devices on network 10 to prevent unauthorized use and managed use of the printing devices connected to the second local network through network management device 20. The functionality of this embodiment is discussed in more detail below.

As also seen in FIG. 9, web server 76 allows web pages such as those described with respect to FIG. 6, to be published over the network to network users, such as a user at workstation 12 or a network administrator at server 14. Lastly, function application modules 82 can provide network-wide functional capabilities for the printing devices managed by network management device 20 and interface with virtual device containers 81 for supporting such network applications on behalf of printing devices managed by network management device 20. For example, functional application modules 82 may include a secure printing application which allows users on network 10 to provide print jobs to printing devices managed by network management device 20 in a secure fashion. Even though the printing devices do not have the embedded functionality for supporting secure printing, virtual device containers 81 act on behalf of their respective printing devices to support such functionality. In this manner, network management device 20 is an extendable management tool for efficiently managing printing devices on a network whereby additional functionality can be added depending on the needs of the particular network.

In addition, network management device 20 can control a network device which it manages, such as a network printer, so as to reconfigure the network device for efficient operation under the management of network management device 20. For example, if a network printer is connected to network management device 20 over the local network, then network management device 20 can use SNMP messages to reconfigure the network printer. Such reconfiguration of the network printer can include, but is not limited to, instructions for the network printer to stop supporting certain protocols and to only use the protocol which network management device 20 uses to communicate with the network printer.

Figure 10:
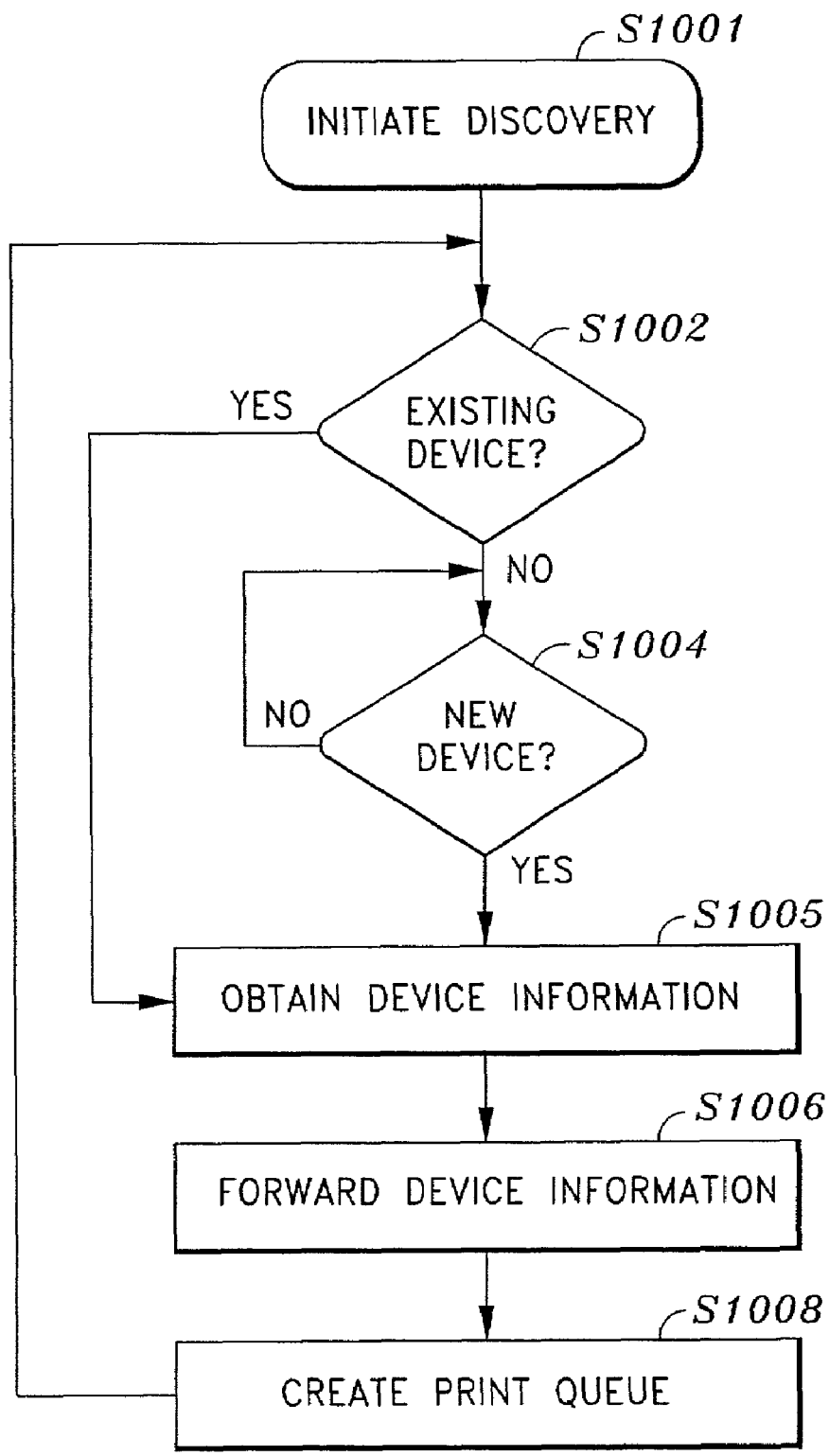
FIG. 10 is a flowchart depicting a process for creating print queues corresponding to network printing devices.

FIG. 10 is a flowchart depicting a process performed by network management device 20 to create print queues corresponding to network printing devices discovered on network 10. As discussed above, discovery of network printing devices on network 10 is coordinated through discovery module 84. In step S1001, the discovery process is initiated when discovery module 84 is activated by network management device 20. In step S1002, discovery module 84 determines if network devices connected to network 10 have been detected and assigned IP addresses prior to discovery module 84 becoming active. Checking for previously detected network devices may occur in different ways depending on the manner in which discovery module 84 is being notified about newly detected network printing devices. For example, if DHCP server 75 is active and assigning new IP addresses to requesting network devices, discovery module 84 will query DHCP server 75 for all network printing devices that have been assigned IP addresses prior to discovery module 84 becoming active. On the other hand, if DHCP server 75 is not active and an external DHCP server, such as DHCP server 34, is being utilized to assign IP addresses to requesting network devices, discovery module 84 utilizes classic discovery methods (as discussed above) to detect existing network devices. Accordingly, discovery module 84 can identify all network devices connected to the network and assigned IP address prior to discovery module 84 becoming active.

If there are no existing network devices on network 10 when discovery module 84 is initialized, discovery module 84 waits for notification of a new device in step S1004. Notification received by discovery module 84 may be limited to network devices with specific IP addresses or specific MAC addresses in order to limit which network devices on network 10 will be supported by network management device 20. For this embodiment, we are assuming that discovery module 84 will only be notified of newly discovered printing devices. Notification of a new device may come in different ways as described earlier. For example, a software hook within DHCP server 75 will notify discovery module 84 of a new network device when an address acknowledgment message is received by DHCP server 75 from a network device that requested an IP address. In the alternative, when an external DHCP server is being used, DHCP listening module 80 will listen on network 10 for an address acknowledgment message from a network device requesting an address from an external DHCP server and notify discovery module 84 of any such network device. Regardless of the manner in which discovery module 84 is notified of a new printing device, the notification includes sufficient identification information of that printing device to allow discovery module to communicate with the printing device. Such information might include, but is not limited to, the IP address and the MAC address of the newly detected printing device.

If discovery module 84 has been notified of a new printing device, or in step S1002 an existing printing device has been found, the print queue creation process proceeds to step S1005 where discovery module 85 obtains additional information from the printing device. For purposes of this description, assume that printer 18 is a newly detected printing device. In step S1005, discovery module 84 sends an information request message to printer 18 via SNMP agent 78 using the IP address provided in the notification. In response to the request message, printer 18 sends a response which includes information including, but not limited to, the type and model of printer 18, as well as information regarding the available functions and capabilities of printer 18. The information might also include available paper sizes, color capabilities, print speed, resolution, etc. As discussed above, discovery module 84 uses this information received from printer 18 to create an entry in device management directory 70. Additionally, discovery module 84 forwards this information to print queue service module 83 in step S1006 so that print queue service module 83 can use the information in the creation of a print queue corresponding to printer 18.

In step S1008, print queue service module 83 creates a print queue corresponding to printer 18, and configures the print queue using the information, such as the addresses, printer type, configuration and capabilities, obtained from printer 18 via SNMP agent 78 by discovery module 84. The created print queue is named according to a set of predetermined rules set up by a network administrator. For example, the print queue may be named according to the make, model, IP address or other attributes (or combination of attributes) of the corresponding printer. Additionally, a print queue name may be obtained from printer 18 in the information obtained by discovery module 84. Once configured, the newly created print queue is stored within print queues 61. Accordingly, a print queue can be created and configured automatically for a newly detected network printing device (or a previously detected printing device) without requiring a network administrator to manually enter the configuration information.

In addition to creating a print queue to be associated with printer 18, print queue service module 83 creates a print queue entry in print queue configuration directory 71. As discussed above, print queue configuration directory 71 contains a plurality of entries corresponding to print queues created and configured by network management device 20 thereby providing a common location for print queue configuration information for all existing print queues on network 10. As shown in FIG. 8, each entry in print queue configuration directory 71 contains fields for IP address, MAC address, print queue name, printing capabilities and the server managing the print queue. The fields for each entry are completed by print queue service module 83 using the information used in creating and configuring the particular print queue.

As mentioned earlier, print server 77 is a print server for managing the print queues of one or more printing devices managed by network management device 20. Once a print queue is created and configured by print queue service module 83, the print queue is registered with print server 77. Print server 77 then proceeds to publish and make the print queue available to client workstations connected to network 10 using conventional protocols such as SMB. In addition, print server 77 may utilize print queue policy rules 59 to regulate use of the print queues by client workstations connected to network 10.

Network management device 20 maintains print queue web page 89, which is stored within web pages 57, using the print queue entries in print queue configuration directory 71. As discussed above, print queue web page 89 is a web page accessible to users of network 10 in which all available print queues managed by network management device 20 and any other network management devices connected on network 20 are published in a single location. Web server 76 is used to publish print queue web page 89 over network 10, thereby allowing a network user to access the listing of available print queues using either a workstation, like workstation 12, or a server, like server 14.

Figure 11:
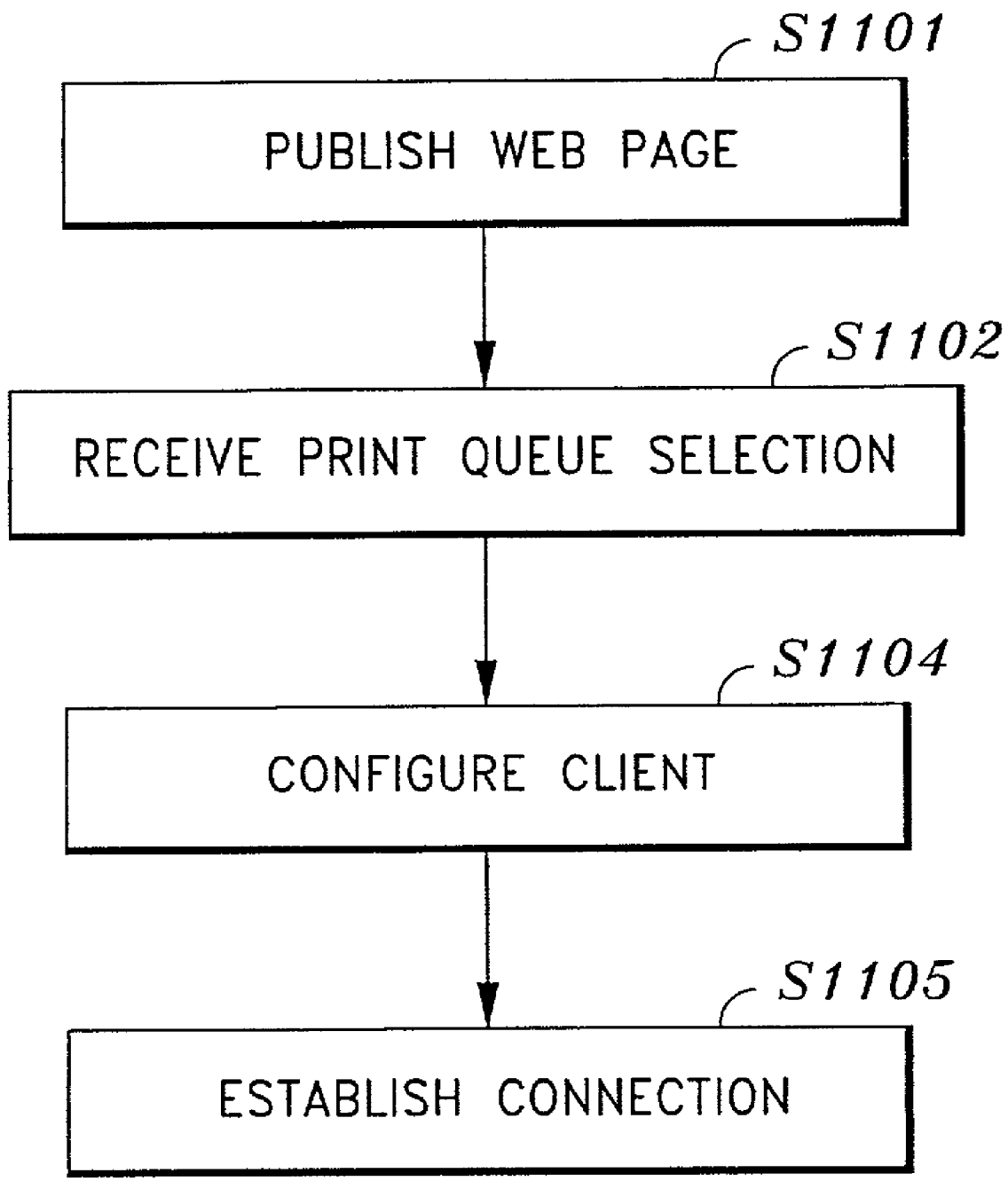
FIG. 11 is a flowchart depicting a process for configuring client workstations.

FIG. 11 depicts a process for configuring a client workstation to utilize a print queue corresponding to one of the network printers, such as printer 18. In step S1101, print queue web page 89 is opened at workstation 12 using user interface 29 and a conventional browser installed on host processor 26. Viewing print queue web page 89, a network user at workstation 12 can search a single listing of all available print queues on network 10 and select a particular print queue. Using user interface 29, a network user may select a desired print queue. Selection may be performed by typing in the print queue name within user interface 29 or by selecting a link associated with the desired print queue within print queue web 89 page using a pointing device such as a mouse.

In step S1102, network management device 20 receives the selection from the available print queues made by the user at workstation 12. Network management device 20 then searches print drivers 60 for the appropriate print driver associated with the selected print queue. In step S1104, Network management device 20 configures the client workstation by sending and installing the appropriate print driver from print drivers 60 on workstation 12 via network 10. Once the print driver is installed on workstation 12, in step S1105 network management device 20 establishes a connection between workstation 12 and print server 77, thereby allowing print jobs to be sent from workstation 12 to the selected print queue. The present invention is not limited to the method described above for configuring a client workstation. For example, the network and the client workstations may utilize an operating system and printing protocol which do not utilize print drivers, such as a UNIX based system. In that case, network management device 20 would execute the necessary functions in step S1104 to make it possible for the requesting client workstation to establish a connection in step S1105.

In the course of managing a computer network, network devices may need to be relocated or replaced. When a device is relocated, it may need to have a new IP address assigned to it for communication within the network. In addition, when dynamic hosting protocols such as DHCP are used to administer IP addresses, situations may arise where a network device is assigned a new IP address. If a network printing device is assigned a new IP address, it is essential that the print queue associated with that printing device is updated with the new IP address in order to maintain consistency for the client workstations connected to that particular print queue for printing purposes. The flowchart depicted in FIG. 12 demonstrates a process for automating the task of updating print queue configurations with new IP addresses.

As described with reference to FIG. 10, either by DHCP server 75 or by DHCP listening module 80 detects the assignment of IP addresses to network devices and notifies discovery module 84. For the purposes of this example, assume printer 18 has been relocated on network 10 and is assigned a new IP address by DHCP server 75. In step S1201, the assignment of an IP address to printer 18 is detected. In step S1202, discovery module 74 is notified that printer 18 has been assigned a new IP address, and discovery module 84 is provided with the IP address assigned to printer 18 and the MAC address of printer 18.

Upon receiving notification that printer 18 has been assigned an IP address, in step S1203 discovery module 84 compares the MAC address of printer 18 with those listed in the entries of device management directory 70. Since printer 18 was previously connected to network 10, an entry is found under the MAC address of printer 18 together with its previous IP address. Using the pair of address (IP and. MAC) from the entry, print queue service module 83 can identify a previously created print queue associated with printer 18 by referring to print queue configuration directory 71. Once the print queue is identified, the process proceeds to step S1205. In step S1205, discovery module 84 instructs print queue service module 83 to update the configuration of the print queue in print queues 61 associated with printer 18 so that the IP address reflects the newly assigned IP address. In addition, in step S1206, print queue service module 83 updates the IP address entry for the print queue in print queue configuration directory 71 to reflect the new IP address of printer 18. Accordingly, all network users with connections to the print queue associated with printer 18 will be able to maintain their connections without interruption due to the IP address change. Additionally, the network administrator is not required to manually change the configuration or entry in print queue configuration directory 71.

Figure 12:
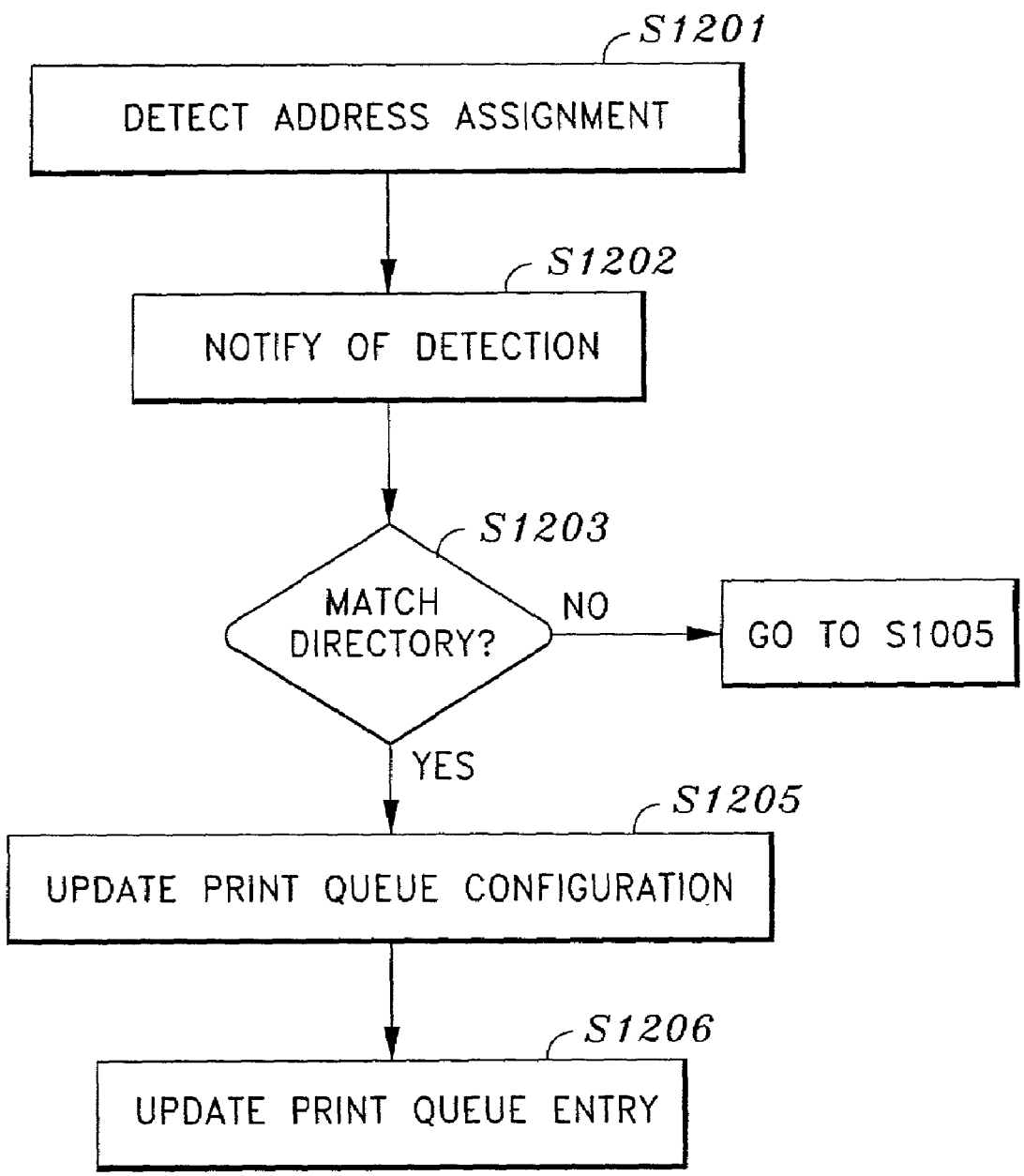
FIG. 12 is a flowchart depicting a process for monitoring and updating network printing device address information.

The process described with reference to FIG. 12 is an expansion of the process described in step S1004 with reference to FIG. 10. In the event that no match is found by discovery module 84 in step S1203, the detected network device has not been previously detected (or at least not within a predetermined time frame). The process then proceeds to step S1005 within FIG. 10 and a print queue is created according to the process described there.

In addition to print queue web page 89, network management device 20 also maintains queue service page 88, which allows users, preferably network administrators, to access and manage the print queues associated with printing devices managed by network management device 20 and any other network management devices connected to network 10. Web server 76 publishes queue service page 88, thereby allowing a user to access the page from a server, such as server 14, using user interface 32.

Queue service web page 88 provides a user with many functions. For example, using queue service web page 88, a user can perform queue management functions including, but not limited to, manually creating or removing print queues, pausing and resuming the operation of a print queue, purging a print queue, and editing the driver associated with a print queue. In addition, queue service web page 88 allows a user to manage individual print jobs within individual print queues. For example, a print job may be paused, restarted, cancelled or reordered. Accordingly, queue service page 88 affords a user a large amount of control over print queues associated with the printing devices of network 10.

As mentioned above, queue service web page 88 allows a user to manage existing print queues on network 10. Using queue service web page 88, an administrator may rename the queue associated with printer 18 using queue service web page 88. However, if the name of a print queue is changed, all network devices, such as workstation 12, that use that particular print queue, will no longer have a connection with printer 18. Each network device with a connection to printer 18 must learn the new print queue name of the print queue associated with printer 18, and the configuration on each network device must be modified to reflect the new print queue name. Additionally, a network administrator may reassign a particular print queue to a different server during network administration or to provide for load balancing. As with changing the name of a print queue, all network devices with a connection to printer 18 must have their connection updated to reflect the new server in order to continue to use printer 18 corresponding to the particular print queue.

Figure 13:
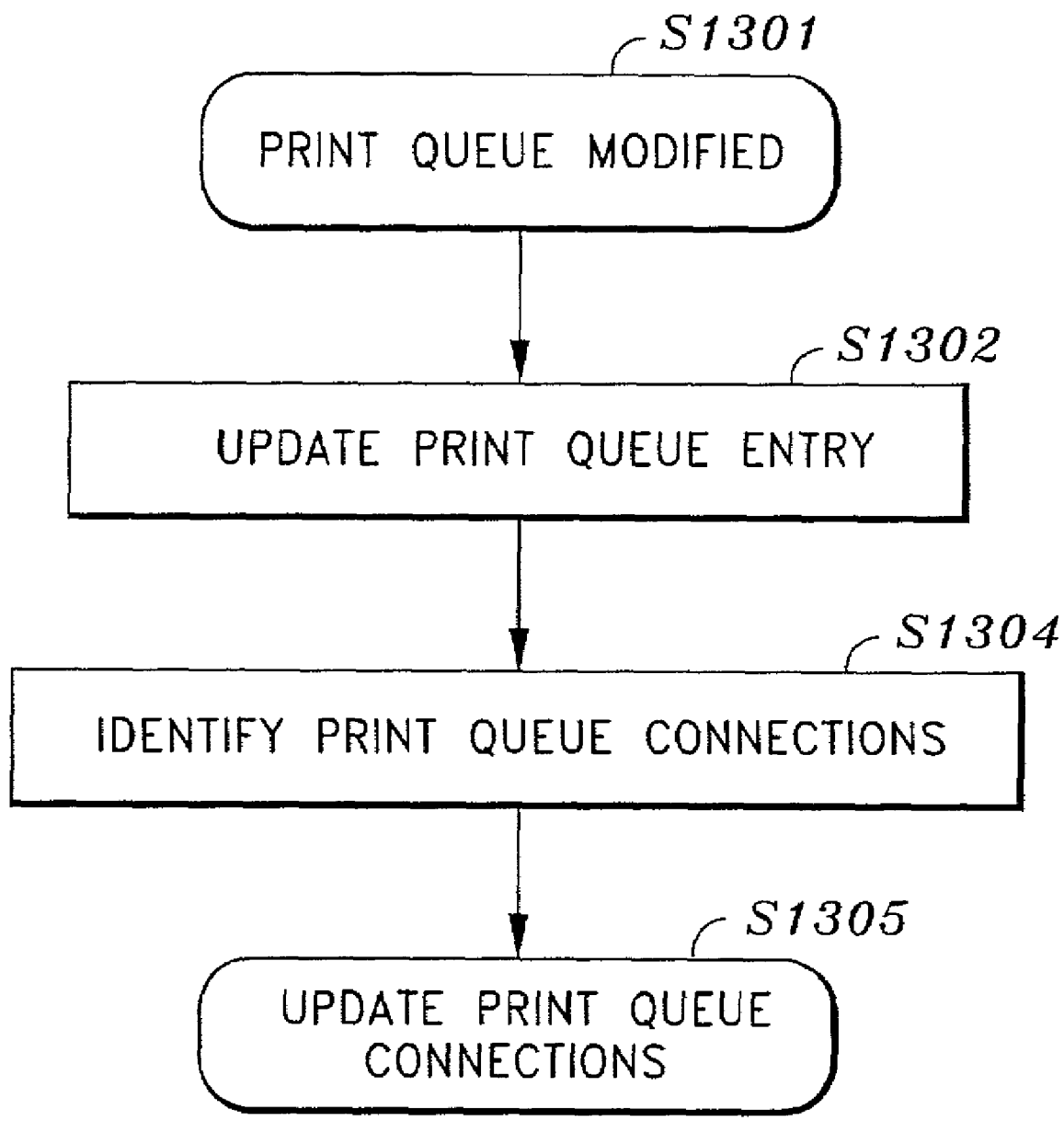
FIG. 13 is a flowchart depicting a process for updating connections with new identification information.

FIG. 13 is a flowchart depicting a process for updating print queue connections when the identification information of a print queue has been changed. For example, the name of a print queue may be changed to provide for easier identification of a particular print queue. Additionally, a print queue may be moved to a different server by a network administrator while organizing the network or to facilitate load balancing among multiple printers available on the network. Regardless of the type of change, when the identification information of a print queue is modified, client workstations on the network will no longer be able to send print jobs to the modified print queue until their connections have been updated.

In step S1301, the identification information of a print queue within print queues 61 is modified either by a network administrator or another process operating on network management device 20. In step S1302, print queue service module 83 compares the identification information of the modified print queue with the entry in print queue configuration directory 71 corresponding to the modified print queue, and modifies the entry to reflect the changes made to the particular print queue. In step S1304, print queue service module 83 identifies client workstations connected to network 10 which are configured to utilize the modified print queue by querying print server 77. Finally, in step S1305, the connection between a client workstation identified in step S1304 and the modified print queue is updated to reflect the new identification information of the print queue. Accordingly, client workstations connected to network 10 can continue to use print queues within print queues 61 regardless of any modifications made to print queue identification information.

The procedure for updating a print queue connection, described with reference to step S1305 above, may vary depending on the network configuration or the protocol used for communicating between the client workstation and the printer. For example, when a print queue is modified, network management device 20 may simply notify software installed on the identified client workstation of the new identification information using a protocol such as SNMP. The software would then update the configuration on the client workstation. Alternatively, the client workstation may allow remote configuration thereby allowing a network administrator or a module within network management device 20 to remotely configure the client workstation with the new identification information of the print queue. Other embodiments may utilize other protocols such as LPD, providing a level of indirection and allowing the connection configuration to be updated within the print server. Regardless of the updating method being used, the present invention maintains the connection between a client workstation and a print queue without requiring action from a network user of the client workstation.

Figure 14:
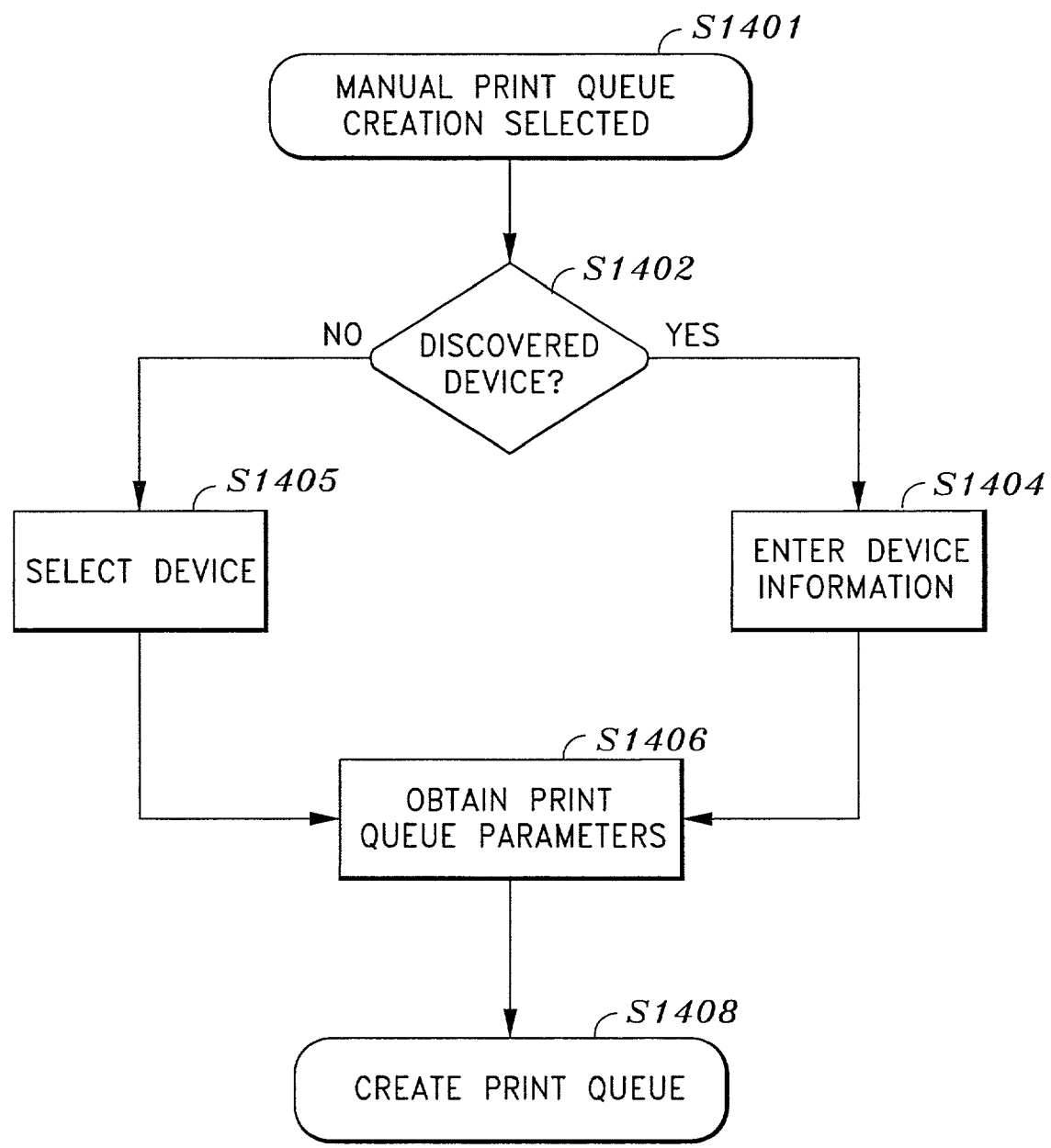
FIG. 14 is a flowchart depicting a process for manual creation of print queues.

As mentioned above, using queue service web page 88, an administrator can manually create a print queue for a network printing device. While the present invention can automatically detect a new printing device and create a print queue for that printing device, situations may arise where manual creation of print queues is required. For example, the auto-create feature of the invention may be disabled by an administrator via queue service web page 88. Additionally, an administrator may designate a maximum number of printing devices or may designate an IP address (or MAC address) range of printing devices to be supported by network management device 20 using queue service web page 88. Upon being notified of a new printing device by discovery module 84, print queue service module 83 will not proceed with the automatic creation of a print queue when the existing number of print queues being supported by network management device 20 has reached a maximum number set by a network administrator or if the IP address (or MAC address) falls outside of a predetermined range. If an administrator wishes to add another print queue under these situations, as well as others, manual creation of the print queue must be performed using queue service web page 88. FIG. 14 depicts a process for manually creating a print queue for a network printing device.

In step S1401, a user, preferably a network administrator, selects manual print queue creation using queue service web page 88. Queue service web page 88 then provides an interface for the user to create and configure a print queue for a particular network printing device. In step S1402, the user is given the option of creating a print queue for either a previously discovered printing device or new printing device. If the user selects creating a print queue for a new printing device, the user then provides identification information about the printing device in step S1404, thereby allowing network management device 20 to contact the printing device over network 10 to obtain additional information from the printing device. The provided identification information includes, but is not limited to, the IP address of the printing device as well as the type of printing device.

If the user opts to create a print queue for a previously detected printing device in step S1402, the user is provided with a list of current printing devices. The list is generated by referring to device management directory 70, which as described above, contains an entry for each network device detected by network management device 20. The user then selects from the list of current printing devices in step S1405. Alternatively, the list from which the user selects a printing device could be generated by discovery module 84 performing one of the classic discovery methods discussed earlier to compile a current list of network devices. Once discovery had been completed by discovery module 84, the list would then be generated and displayed for the user to select from.

After the user has entered identification information for the printing device in step S1404, or selected a current printing device in step S1405, the process proceeds to step S1406 where the parameters required for configuring the new print queue are obtained. Discovery module 84 obtains additional information from the printing device using a service such as SNMP agent 78 as described above regarding step S1005 in FIG. 10. Additionally, the user is prompted for information needed to establish other properties of the print queue such as load balancing, fail over printing, automatic share reconfiguration, etc. Once all the necessary information has been obtained from the printing device and the user, print queue service module 83 is provided with the obtained information and instructed to create a print queue in step S1408. In step S1408, Print queue service module 83 creates a print queue in the manner described above regarding step S1008 in FIG. 10.

The present invention has been described with particular illustrative embodiments. It is to be understood that the invention is not limited to the above-described embodiments and the various changes and modifications may be made by those of ordinary skill in the art without departing from the spirit and scope of the invention.

What is claimed is:

1. A method for managing print queues for a plurality of printing devices connected on a network, said method comprising the steps of:
    detecting a printing device connected on the network;
    requesting configuration information from the detected printing device;
    receiving the requested configuration information from the printing device;
    entering policy rules that govern how print queues are created and published, wherein the policy rules are entered by a system administrator;
    accessing the policy rules;
    creating a print queue for the printing device based on the received configuration information and based on the accessed policy rules; and
    publishing the print queue to the network according to the accessed policy rules,
    wherein the system administrator designates a maximum number of printing devices to be supported using a print queue management user interface, and a print queue is not created for a printing device once an existing number of print queues has reached the designated maximum number.

2. A method according to claim 1, wherein the printing device is detected by detecting an address assignment message sent between an address server and the printing device over the network.

3. A method according to claim 2, wherein the address assignment message is a DHCP message.

4. A method according to claim 2, wherein the address assignment message contains an IP address and a MAC address corresponding to the printing device.

5. A method according to claim 1, wherein the printing device is detected by sending a request message to each of a plurality of network addresses and receiving a response message from the printing device located at one of the plurality of network addresses.

6. A method according to claim 5, wherein the plurality of network addresses comprises a numerical range of IP addresses.

7. A method according to claim 5, wherein the plurality of network addresses comprises a plurality of IP address contained within a routing table.

8. A method according to claim 1, wherein the printing device is detected by broadcasting a request message over the network and receiving a response message from the printing device connected on the network.

9. A method according to claim 1, where the configuration information is requested by sending an SNMP message to the detected printing device.

10. A method according to claim 1, wherein the received configuration information comprises a type of printing device corresponding to the type of the detected printing device.

11. A method according to claim 10, wherein the received configuration information further comprises printing capabilities of the detected printing device.

12. A method according to claim 1, further comprising the step of creating a print queue entry in a print queue configuration database, the print queue entry including the received configuration information.

13. A method according to claim 12, wherein the received configuration information includes an IP address, a MAC address, and printing capabilities corresponding to the printing device associated with the print queue.

14. A method according to claim 12, further comprising the step of creating a print queue web page containing a plurality of links representing each of the print queue entries in the print queue configuration database.

15. A method according to claim 14, further comprising the step of receiving from a workstation on the network a selection of one of the plurality of links on the print queue web page, and in response to the selection, configuring the workstation to print to the print queue represented by the link.

16. A method according to claim 15, wherein configuring the workstation to print to the print queue comprises transferring a print driver corresponding to the print queue to the workstation.

17. A method according to claim 12, further comprising the steps of:
detecting a new IP address of one of the plurality of printing devices having a corresponding print queue entry in the print queue configuration database;
updating a configuration of the corresponding print queue in response to detecting a new IP address of the printing device, so that the print queue is based on the new IP address; and
updating an IP address in the print queue entry corresponding to the print queue in response to detecting a new IP address.

18. A method according to claim 12, further comprising the steps of:
detecting new identification information of a print queue corresponding to one of the plurality of printing devices having a corresponding print queue entry in the print queue configuration database;
updating the identification information in the print queue entry corresponding to the print queue in response to detecting the new identification information; and
updating a connection between a network workstation and the print queue with the new identification information.

19. A method according to claim 18, wherein the identification information includes a print queue name.

20. A method according to claim 18, wherein the identification information includes a server that manages the print queue.

21. A method according to claim 1, further comprising the step of creating a queue service web page which provides a user interface to a workstation on the network for print queue management.

22. A method according to claim 21, wherein the user interface provides a process for manual creation of a print queue.

23. A method according to claim 22, wherein the process for manual creation of a print queue comprises the steps of:
receiving a user selection from the user interface designating a printing device on the network;
obtaining configuration information about the printing device in response to receiving the user selection; and
creating a print queue, in response to a command input into the user interface, corresponding to the printing device based on the obtained information.

24. A method according to claim 22, wherein the user interface provides a function for managing print jobs contained in a designated print queue.

25. A method according to claim 1, further comprising the steps of:
continuously polling printing devices connected to the network;
determining if a configuration of the printing devices has changed; and
updating the print queue corresponding to a printing device whose configuration has been determined to have changed.

26. A method according to claim 1, wherein said policy rules include rules which regulate use of the print queue by client workstations connected to the network.

27. A network management device for managing print queues for a plurality of printing devices on a network, said network management device comprising:
a program memory for storing process steps executable to perform a method comprising the steps of (a) detecting a printing device connected on the network, (b) requesting configuration information from the detected printing device, (c) receiving the requested configuration information from the printing device, (d) accepting entry of policy rules that govern how print queues are created and published, wherein the policy rules are entered by a system administrator, (e) accessing the policy rules, (f) creating a print queue for the printing device based on the received configuration information and based on the accessed policy rules, and (g) publishing the print queue to the network according to the accessed policy rules; and
a processor for executing the process steps stored in said program memory,
wherein the system administrator designates a maximum number of printing devices to be supported using a print queue management user interface, and a print queue is not created for a printing device once an existing number of print queues has reached the designated maximum number.

28. A network management device according to claim 27, wherein the printing device is detected by detecting an address assignment message sent between an address server and the printing device over the network.

29. A network management device according to claim 28, wherein the address assignment message is a DHCP message.

30. A network management device according to claim 28, wherein the address assignment message contains an IP address and a MAC address corresponding to the printing device.

31. A network management device according to claim 27, wherein the printing device is detected by sending a request message to each of a plurality of network addresses and receiving a response message from the printing device located at one of the plurality of network addresses.

32. A network management device according to claim 31, wherein the plurality of network addresses comprises a numerical range of IP addresses.

33. A network management device according to claim 31, wherein the plurality of network addresses comprises a plurality of IP address contained within a routing table.

34. A network management device according to claim 27, wherein the printing device is detected by broadcasting a request message over the network and receiving a response message from the printing device connected on the network.

35. A network management device according to claim 27, where the configuration information is requested by sending an SNMP message to the detected printing device.

36. A network management device according to claim 27, wherein the received configuration information comprises a type of printing device corresponding to the type of the detected printing device.

37. A network management device according to claim 36, wherein the received configuration information further comprises printing capabilities of the detected printing device.

38. A network management device according to claim 27, the method further comprising the step of creating a print queue entry in a print queue configuration database, the print queue entry including the received configuration information.

39. A network management device according to claim 38, wherein the received configuration information includes an IP address, a MAC address, and printing capabilities corresponding to the printing device associated with the print queue.

40. A network management device according to claim 38, the method further comprising the step of creating a print queue web page containing a plurality of links representing each of the print queue entries in the print queue configuration database.

41. A network management device according to claim 40, the method further comprising the step of receiving from a workstation on the network a selection of one of the plurality of links on the print queue web page, and in response to the selection, configuring the workstation to print to the print queue represented by the link.

42. A network management device according to claim 41, wherein configuring the workstation to print to the print queue comprises transferring a print driver corresponding to the print queue to the workstation.

43. A network management device according to claim 38, the method further comprising the steps of:
    detecting a new IP address of one of the plurality of printing devices having a corresponding print queue entry in the print queue configuration database;
    updating a configuration of the corresponding print queue in response to detecting a new IP address of the printing device, so that the print queue is based on the new IP address; and
    updating an IP address in the print queue entry corresponding to the print queue in response to detecting a new IP address.

44. A network management device according to claim 38, the method further comprising the steps of:
    detecting new identification information of a print queue corresponding to one of the plurality of printing devices having a corresponding print queue entry in the print queue configuration database;
    updating the identification information in the print queue entry corresponding to the print queue in response to detecting the new identification information; and
    updating a connection between a network workstation and the print queue with the new identification information.

45. A network management device according to claim 44, wherein the identification information includes a print queue name.

46. A network management device according to claim 44, wherein the identification information includes a server that manages the print queue.

47. A network management device according to claim 27, the method further comprising the step of creating a queue service web page which provides a user interface to a workstation on the network for print queue management.

48. A network management device according to claim 47, wherein the user interface provides a process for manual creation of a print queue.

49. A network management device according to claim 48, wherein the process for manual creation of a print queue comprises the steps of:
    receiving a user selection from the user interface designating a printing device on the network;
    obtaining configuration information about the printing device in response to receiving the user selection; and
    creating a print queue, in response to a command input into the user interface, corresponding to the printing device based on the obtained information.

50. A network management device according to claim 48, wherein the user interface provides a function for managing print jobs contained in a designated print queue.

51. A network management device according to claim 27, the method further comprising the steps of:
    continuously polling printing devices connected to the network;
    determining if a configuration of the printing devices has changed; and
    updating the print queue corresponding to a printing device whose configuration has been determined to have changed.

52. A network management device according to claim 27, wherein said policy rules include rules which regulate use of the print queue by client workstations connected to the network.

53. Computer-executable process steps stored on a computer-readable medium, said computer-executable process steps for managing print queues for a plurality of printing devices on a network, said computer-executable process steps executable to perform a method comprising the steps of:
    detecting a printing device connected on the network;
    requesting configuration information from the detected printing device;
    receiving the requested configuration information from the printing device;
    accepting entry of policy rules that govern how print queues are created and published, wherein the policy rules are entered by a system administrator;
    accessing the policy rules;
    creating a print queue for the printing device based on the received configuration information and based on the accessed policy rules; and
    publishing the print queue to the network according to the accessed policy rules,
    wherein the system administrator designates a maximum number of printing devices to be supported using a print queue management user interface, and a print queue is not created for a printing device once an existing number of print queues has reached the designated maximum number.

54. Computer-executable process steps according to claim 53, wherein the printing device is detected by detecting an address assignment message sent between an address server and the printing device over the network.

55. Computer-executable process steps according to claim 54, wherein the address assignment message is a DHCP message.

56. Computer-executable process steps according to claim 54, wherein the address assignment message contains an IP address and a MAC address corresponding to the printing device.

57. Computer-executable process steps according to claim 53, wherein the printing device is detected by sending a request message to each of a plurality of network addresses and receiving a response message from the printing device located at one of the plurality of network addresses.

58. Computer-executable process steps according to claim 57, wherein the plurality of network addresses comprises a numerical range of IP addresses.

59. Computer-executable process steps according to claim 57, wherein the plurality of network addresses comprises a plurality of IP address contained within a routing table.

60. Computer-executable process steps according to claim 53, wherein the printing device is detected by broadcasting a request message over the network and receiving a response message from the printing device connected on the network.

61. Computer-executable process steps according to claim 53, where the configuration information is requested by sending an SNMP message to the detected printing device.

62. Computer-executable process steps according to claim 53, wherein the received configuration information comprises a type of printing device corresponding to the type of the detected printing device.

63. Computer-executable process steps according to claim 62, wherein the received configuration information further comprises printing capabilities of the detected printing device.

64. Computer-executable process steps according to claim 53, the method further comprising the step of creating a print queue entry in a print queue configuration database, the print queue entry including the received configuration information.

65. Computer-executable process steps according to claim 64, wherein the received configuration information includes an IP address, a MAC address, and printing capabilities corresponding to the printing device associated with the print queue.

66. Computer-executable process steps according to claim 64, the method further comprising the step of creating a print queue web page containing a plurality of links representing each of the print queue entries in the print queue configuration database.

67. Computer-executable process steps according to claim 66, the method further comprising the step of receiving from a workstation on the network a selection of one of the plurality of links on the print queue web page, and in response to the selection, configuring the workstation to print to the print queue represented by the link.

68. Computer-executable process steps according to claim 67, wherein configuring the workstation to print to the print queue comprises transferring a print driver corresponding to the print queue to the workstation.

69. Computer-executable process steps according to claim 64, the method further comprising the steps of:
detecting a new IP address of one of the plurality of printing devices having a corresponding print queue entry in the print queue configuration database;
updating a configuration of the corresponding print queue in response to detecting a new IP address of the printing device, so that the print queue is based on the new IP address; and
updating an IP address in the print queue entry corresponding to the print queue in response to detecting a new IP address.

70. Computer-executable process steps according to claim 64, the method further comprising the steps of:
detecting new identification information of a print queue corresponding to one of the plurality of printing devices having a corresponding print queue entry in the print queue configuration database;
updating the identification information in the print queue entry corresponding to the print queue in response to detecting the new identification information; and
updating a connection between a network workstation and the print queue with the new identification information.

71. Computer-executable process steps according to claim 70, wherein the identification information includes a print queue name.

72. Computer-executable process steps according to claim 70, wherein the identification information includes a server that manages the print queue.

73. Computer-executable process steps according to claim 53, the method further comprising the step of creating a queue service web page which provides a user interface to a workstation on the network for print queue management.

74. Computer-executable process steps according to claim 73, wherein the user interface provides a process for manual creation of a print queue.

75. Computer-executable process steps according to claim 74, wherein the process for manual creation of a print queue comprises the steps of:
receiving a user selection from the user interface designating a printing device on the network;
obtaining configuration information about the printing device in response to receiving the user selection; and
creating a print queue, in response to a command input into the user interface, corresponding to the printing device based on the obtained information.

76. Computer-executable process steps according to claim 74, wherein the user interface provides a function for managing print jobs contained in a designated print queue.

77. Computer-executable process steps according to claim 53, wherein said policy rules include rules which regulate use of the print queue by client workstations connected to the network.

78. Computer-executable process steps according to claim 53, the method further comprising the steps of:
continuously polling printing devices connected to the network;
determining if a configuration of the printing devices has changed; and
updating the print queue corresponding to a printing device whose configuration has been determined to have changed.

79. A computer-readable medium which stores computer-executable process steps, the computer-executable process steps to manage print queues for a plurality of printing devices on a network, said computer-executable process steps comprising process steps executable to perform a method comprising the steps of:

detecting a printing device connected on the network;
requesting configuration information from the detected printing device;
receiving the requested configuration information from the printing device;
accepting entry of policy rules that govern how print queues are created and published, wherein the policy rules are entered by a system administrator;
accessing the policy rules;
creating a print queue for the printing device based on the received configuration information and based on the accessed policy rules; and
publishing the print queue to the network according to the accessed policy rules,
wherein the system administrator designates a maximum number of printing devices to be supported using a print queue management user interface, and a print queue is not created for a printing device once an existing number of print queues has reached the designated maximum number.

80. A computer-readable medium according to claim 79, wherein the printing device is detected by detecting an address assignment message sent between an address server and the printing device over the network.

81. A computer-readable medium according to claim 80, wherein the address assignment message is a DHCP message.

82. A computer-readable medium according to claim 80, wherein the address assignment message contains an J.P address and a MAC address corresponding to the printing device.

83. A computer-readable medium according to claim 79, wherein the printing device is detected by sending a request message to each of a plurality of network addresses and receiving a response message from the printing device located at one of the plurality of network addresses.

84. A computer-readable medium according to claim 83, wherein the plurality of network addresses comprises a numerical range of IP addresses.

85. A computer-readable medium according to claim 83, wherein the plurality of network addresses comprises a plurality of IP address contained within a routing table.

86. A computer-readable medium according to claim 79, wherein the printing device is detected by broadcasting a request message over the network and receiving a response message from the printing device connected on the network.

87. A computer-readable medium according to claim 79, where the configuration information is requested by sending an SNMP message to the detected printing device.

88. A computer-readable medium according to claim 79, wherein the received configuration information comprises a type of printing device corresponding to the type of the detected printing device.

89. A computer-readable medium according to claim 88, wherein the received configuration information further comprises printing capabilities of the detected printing device.

90. A computer-readable medium according to claim 79, the method further comprising the step of creating a print queue entry in a print queue configuration database, the print queue entry including the received configuration information.

91. A computer-readable medium according to claim 90, wherein the received configuration information includes an IP address, a MAC address, and printing capabilities corresponding to the printing device associated with the print queue.

92. A computer-readable medium according to claim 90, the method further comprising the step of creating a print queue web page containing a plurality of links representing each of the print queue entries in the print queue configuration database.

93. A computer-readable medium according to claim 92, the method further comprising the step of receiving from a workstation on the network a selection of one of the plurality of links on the print queue web page, and in response to the selection, configuring the workstation to print to the print queue represented by the link.

94. A computer-readable medium according to claim 93, wherein configuring the workstation to print to the print queue comprises transferring a print driver corresponding to the print queue to the workstation.

95. A computer-readable medium according to claim 90, the method further comprising the steps of:
detecting a new IP address of one of the plurality of printing devices having a corresponding print queue entry in the print queue configuration database;
updating a configuration of the corresponding print queue in response to detecting a new IP address of the printing device, so that the print queue is based on the new IP address; and
updating an IP address in the print queue entry corresponding to the print queue in response to detecting a new IP address.

96. A computer-readable medium according to claim 90, the method further comprising the steps of:
detecting new identification information of a print queue corresponding to one of the plurality of printing devices having a corresponding print queue entry in the print queue configuration database;
updating the identification information in the print queue entry corresponding to the print queue in response to detecting the new identification information; and
updating a connection between a network workstation and the print queue with the new identification information.

97. A computer-readable medium according to claim 96, wherein the identification information includes a print queue name.

98. A computer-readable medium according to claim 96, wherein the identification information includes a server that manages the print queue.

99. A computer-readable medium according to claim 79, the method further comprising the step of creating a queue service web page which provides a user interface to a workstation on the network for print queue management.

100. A computer-readable medium according to claim 99, wherein the user interface provides a process for manual creation of a print queue.

101. A computer-readable medium according to claim 100, wherein the process for manual creation of a print queue comprises the steps of:
receiving a user selection from the user interface designating a printing device on the network;
obtaining configuration information about the printing device in response to receiving the user selection; and
creating a print queue, in response to a command input into the user interface, corresponding to the printing device based on the obtained information.

102. A computer-readable medium according to claim 100, wherein the user interface provides a function for managing print jobs contained in a designated print queue.

103. A computer-readable medium according to claim 79, the method further comprising the steps of:
- continuously polling printing devices connected to the network;
- determining if a configuration of the printing devices has changed; and
- updating the print queue corresponding to a printing device whose configuration has been determined to have changed.

104. A computer-readable medium according to claim 79, wherein said policy rules include rules which regulate use of the print queue by client workstations connected to the network.

\* \* \* \* \*